(12) United States Patent
Kawakami et al.

(10) Patent No.: US 11,351,819 B2
(45) Date of Patent: Jun. 7, 2022

(54) PNEUMATIC TIRE

(71) Applicant: TOYO TIRE CORPORATION, Itami (JP)

(72) Inventors: Kazuki Kawakami, Itami (JP); Makoto Yoshikawa, Itami (JP)

(73) Assignee: TOYO TIRE CORPORATION, Itami (JP)

( * ) Notice: Subject to any disclaimer, the term of this patent is extended or adjusted under 35 U.S.C. 154(b) by 420 days.

(21) Appl. No.: 16/374,087

(22) Filed: Apr. 3, 2019

(65) Prior Publication Data

US 2019/0263196 A1  Aug. 29, 2019

Related U.S. Application Data

(62) Division of application No. 14/743,040, filed on Jun. 18, 2015, now abandoned.

(30) Foreign Application Priority Data

| Jun. 18, 2014 | (JP) | 2014-125575 |
| Jun. 18, 2014 | (JP) | 2014-125580 |
| Jun. 18, 2014 | (JP) | 2014-125582 |
| Oct. 31, 2014 | (JP) | 2014-223383 |

(51) Int. Cl.
*B60C 13/00* (2006.01)

(52) U.S. Cl.
CPC ................... *B60C 13/001* (2013.01)

(58) Field of Classification Search
CPC .................................................. B60C 13/001
See application file for complete search history.

(56) References Cited

U.S. PATENT DOCUMENTS

| 4,442,618 | A | 4/1984 | Minter et al. |
| 5,904,794 | A | 5/1999 | Boissonnet et al. |
| D601,489 | S | 10/2009 | Lundgren |
| 2004/0060640 | A1* | 4/2004 | Pialot .................... B60C 13/001 156/116 |
| 2006/0032569 | A1 | 2/2006 | Zimmer et al. |
| 2010/0051159 | A1* | 3/2010 | Fujioka ................. B60C 13/001 152/523 |
| 2013/0299056 | A1* | 11/2013 | Iwabuchi .............. B60C 13/001 152/523 |

FOREIGN PATENT DOCUMENTS

| JP | 58-148746 A | | 9/1983 |
| JP | 59-190010 A | | 10/1984 |
| JP | 63-106107 A | | 5/1988 |
| JP | S63-106106 | * | 5/1988 |
| JP | 1-114303 U | | 8/1989 |

(Continued)

OTHER PUBLICATIONS

Office Action dated May 14, 2019, issued in counterpart JP Application No. 2014-125582, with English translation (9 pages).

(Continued)

*Primary Examiner* — Robert C Dye
(74) *Attorney, Agent, or Firm* — WHDA, LLP

(57) ABSTRACT

A pneumatic tire comprises a recessed portion or a projecting portion formed on a side portion so as to constitute a mark, and a colored portion formed in at least a part of a periphery along an outer edge of the mark.

5 Claims, 33 Drawing Sheets

(56) References Cited

FOREIGN PATENT DOCUMENTS

| | | | |
|---|---|---|---|
| JP | 8-34213 A | | 2/1996 |
| JP | 4404384 B2 | | 1/2010 |
| JP | 2012-030768 A | | 2/2012 |
| JP | 2012-061971 A | | 3/2012 |
| JP | 2012-076649 A | | 4/2012 |
| JP | 2012-131283 | * | 7/2012 |
| JP | 2013-129233 | * | 7/2013 |
| JP | 2014-019367 A | | 2/2014 |
| WO | 2012/032741 A1 | | 3/2012 |

OTHER PUBLICATIONS

Office Action dated Sep. 12, 2017, issued in counterpart Japanese Application No. 2014-125575, with English translation. (8 pages).
Office Action dated Sep. 12, 2017, issued in counterpart Japanese Application No. 2014-125582, with English translation. (8 pages).
Office Action dated Jan. 23, 2018, issued in counterpart Japanese Application No. 2014-223383, with English translation. (5 pages).

* cited by examiner

PNEUMATIC TIRE

CROSS-REFERENCE TO RELATED APPLICATIONS

This application is a Divisional of U.S. application Ser. No. 14/743,040, filed on Jun. 18, 2015, which is based upon and claims priority of Japanese Patent Application Nos.: 2014-125575, 2014-125580, 2014-125582, and 2014-223383, the content of which is incorporated herein by reference.

BACKGROUND OF THE INVENTION

Technical Field

The present invention relates to a pneumatic tire.

Related Art

In general, on a side portion of a pneumatic tire, a mark such as a character, a figure, or a symbol is formed so as to indicate information such as a size, a product name, a manufacturer, or a date of manufacture.

JP 2012-61971 A discloses a technique where a mark is formed of a projecting portion which is formed by raising a side portion of a tire, and the whole top surface of the projecting portion is colored with a color different from a base color of the tire for enhancing visibility of the mark.

SUMMARY

When the whole top surface of the projecting portion which forms a mark is tinted with a color as described in JP 2012-61971 A, it is necessary to apply a color also to an edge formed by the top surface and a side surface of the projecting portion. Applying of color to the edge requires extremely high positional accuracy.

It is an object of the present invention to enhance visibility of a mark of a pneumatic tire.

A aspect of the present invention provides a pneumatic tire comprising, a recessed portion or a projecting portion formed on a side portion so as to constitute a mark, and a colored portion formed in at least a part of a periphery along an outer edge of the mark.

The mark is constituted by the recessed portion or the projecting portion formed on the side portion. The colored portion is formed in at least the part of the periphery of the recessed portion or the projecting portion. These arrangements enhance visibility of the mark, especially three-dimensional appearance of the mark. Further, because formed in a substantially flat surface of the side portion, the colored portion can be easily obtained.

It is preferable that the second colored portion is offset from the recessed portion or the projecting portion forming the mark.

It is preferable that the pneumatic tire further comprises a first colored portion formed on a bottom surface of the recessed portion or on a top surface of the projecting portion.

It is preferable that an offset amount which is a distance between a profile line of the second colored portion and the edge of the mark is set in a tire circumferential direction to a value which falls within a range of 0.5% to 40% of a maximum size of the top surface in the tire circumferential direction.

It is preferable that an offset amount which is a distance between a profile line of the second colored portion and the edge of the mark is set to a fixed value regardless of a position on the profile line.

It is preferable that an offset amount which is a distance between a profile line of the second colored portion and the edge of the mark differs with respect to at least one of a tire radial direction and the tire circumferential direction depending on a position on the profile line.

It is preferable that a recessed portion is formed on the top surface of the projecting portion, the first colored portion is formed on the top surface where the recessed portion is not formed and the bottom surface of the recessed portion.

It is preferable that the second colored portion has at least one of hue, brightness, and chroma different from each other.

It is preferable that the second colored portion changes in at least hue, brightness, and chroma from a certain position to another position.

BRIEF DESCRIPTION OF THE DRAWINGS

The foregoing and the other features of the present invention will become apparent from the following description and drawings of an illustrative embodiment of the invention in which.

DETAILED DESCRIPTION OF EMBODIMENTS

Hereinafter, embodiments according to the present invention are described with reference to attached drawings. The description made hereinafter is provided substantially for merely illustrating the present invention, and the description does not intend to limit the present invention, a product to which the present invention is applied or a usage where the present invention is used. Further, drawings are schematic drawings, and ratios between the respective sizes may differ from actual corresponding ratios and the like.

First Embodiment

Figure 1:
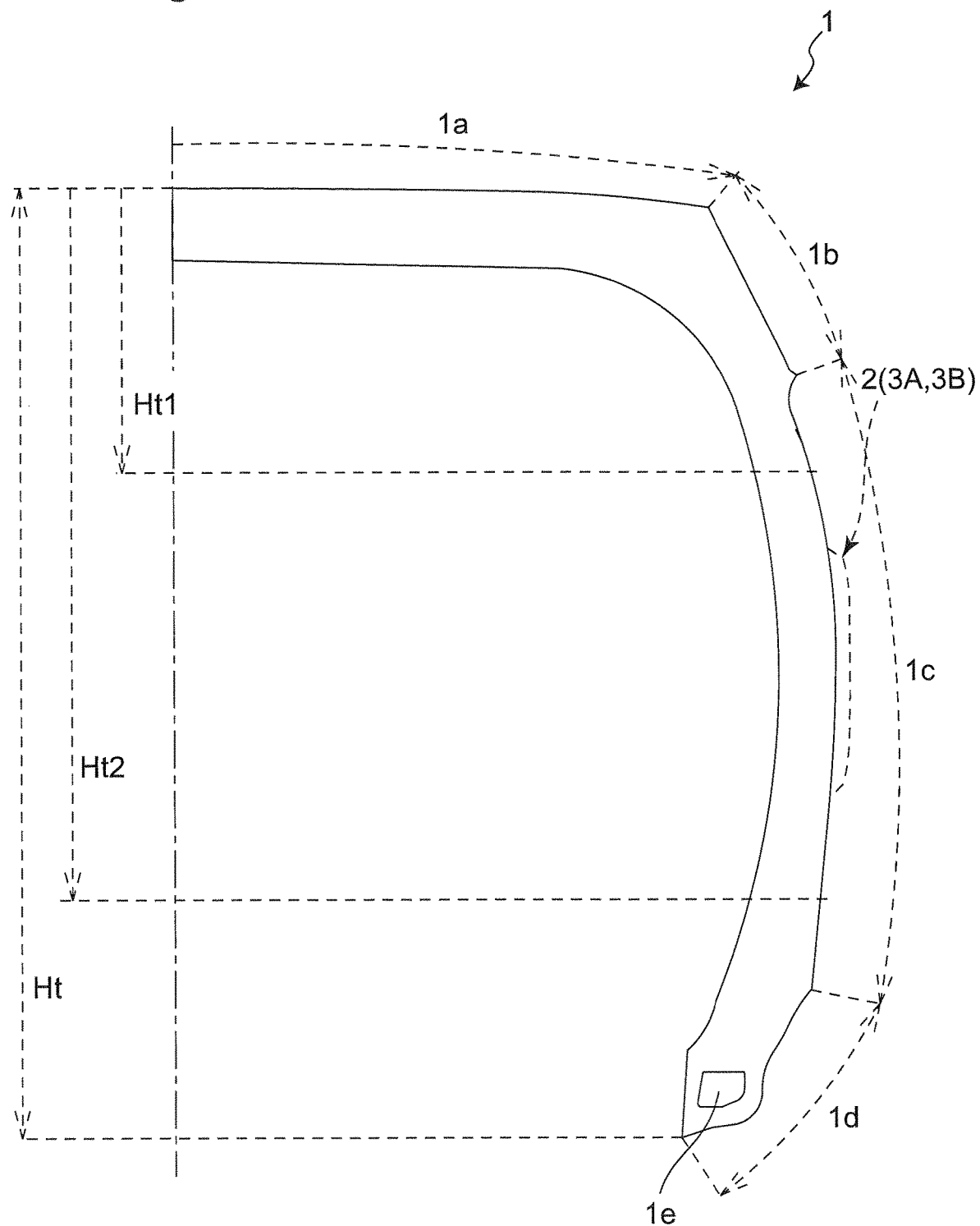
FIG. 1 is a partial sectional view on a tire equatorial plane of a pneumatic tire according to a first embodiment of the present invention.

A pneumatic tire 1 according to this embodiment shown in FIG. 1 (hereinafter simply referred to as "tire") includes a tread portion 1a, shoulder portions 1b, side portions 1c and bead portions 1d. The side portions 1c extend inwardly in a tire radial direction from both ends of the tread portion 1a in a tire width direction by way of the shoulder portions 1b. The bead portions 1d are continuously formed on inner end portions of the side portions 1c in a tire radial direction. In FIG. 1, the illustration of the inner structure of the tire 1 is omitted except for bead cores 1e.

Figure 2:
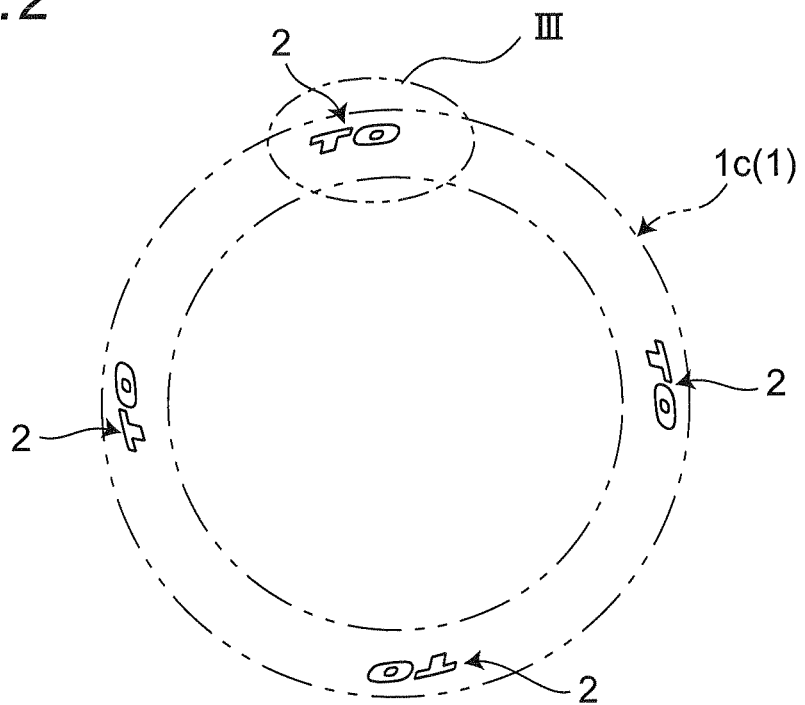
FIG. 2 is a front view of a side portion of the pneumatic tire of FIG. 1 shown in a tire width direction.
Figure 3:
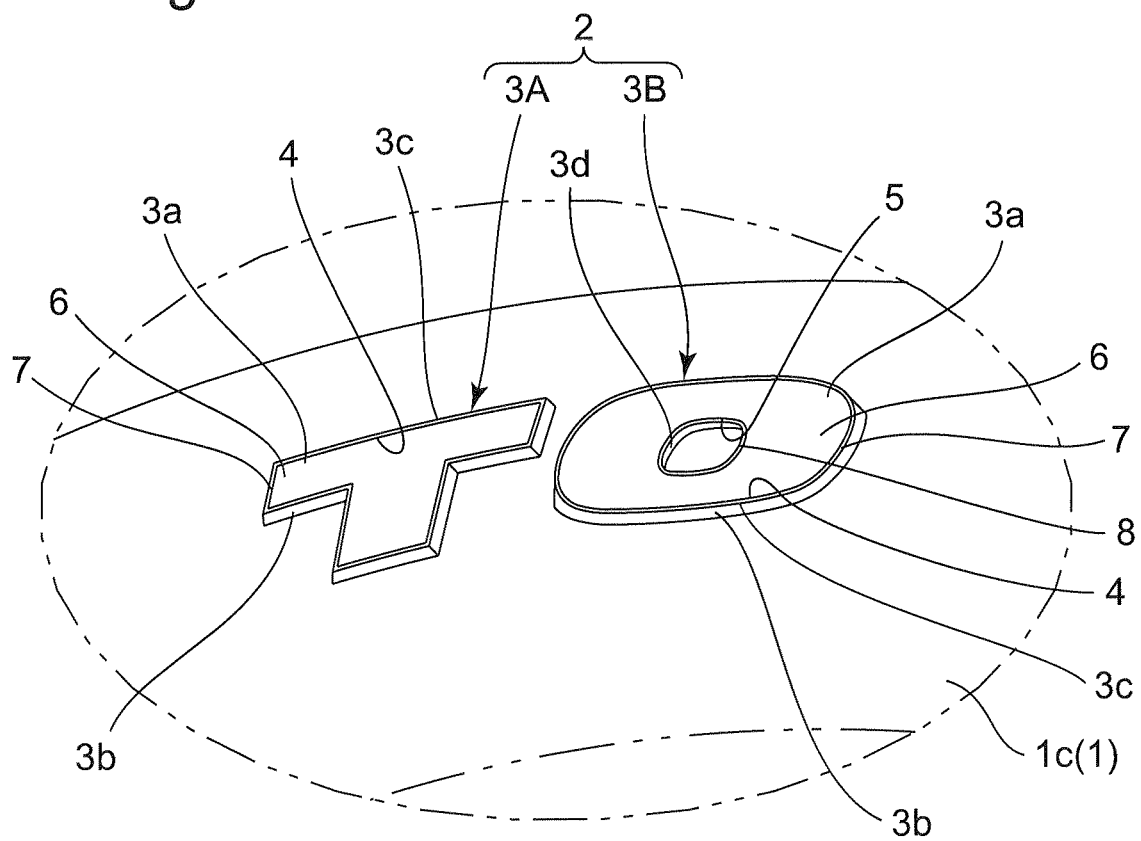
FIG. 3 is a partial enlarged view of a portion III in FIG. 2.

To describe this embodiment also with reference to FIGS. 2 and 3, four display portions 2 are formed on the side portions 1c in such a manner that the display portions 2 are arranged at equal intervals in a tire circumferential direction. The individual display portion 2 includes two projecting portions 3A, 3B which respectively express marks. The individual projecting portions 3A, 3B are formed so as to be raised outwardly in the tire radial direction from an outer surface of the side portion 1c. Although a range in a tire cross-section height direction where the display portions 2 are formed is not particularly limited, it is preferable that the display portions be arranged within a range from a height position Ht1 which is 30% of a tire cross-section height Ht to a height position Ht2 which is 70% of the tire cross-section height Ht1 (see FIG. 1). It is particularly preferable that the display portions 2 be arranged within a range of 15% to 45% of the tire cross-section height Ht. For example, when the tire 1 is a tire of 225/50R18, the tire cross-section height Ht becomes 112.5 mm and hence, the display portions 2 (projecting portions 3A, 3B) can be arranged within a range of 33.75 mm to 84.375 mm. The position where the display portions 2 are formed is also applicable to the second to ninth embodiments in the same manner.

In this embodiment, the projecting portions 3A, 3B, particularly top surfaces 3a of these projecting portions 3A, 3B respectively include a shape corresponding to capitals "T" and "O" of alphabet, respectively. The number of display portions 2 formed on the side portion 1c and the number of projecting portions that each display portion 2 includes are not limited to the example shown in FIGS. 2 and 3. Marks which the individual projecting portions forming the display portion 2 express are not limited to the example shown in FIGS. 2 and 3, and may be any one of a character, a figure or a symbol. Further, one projecting portion may be the combination of two or more selected from a group consisting of a character, a figure and a symbol.

To describe this embodiment also with reference to FIGS. 4 to 7, the individual projecting portions 3A, 3B include a top surface 3a which is a flat surface extending substantially parallel to an outer surface of the side portion 1c. The top surface 3a may be formed of a curved surface.

Figure 4:
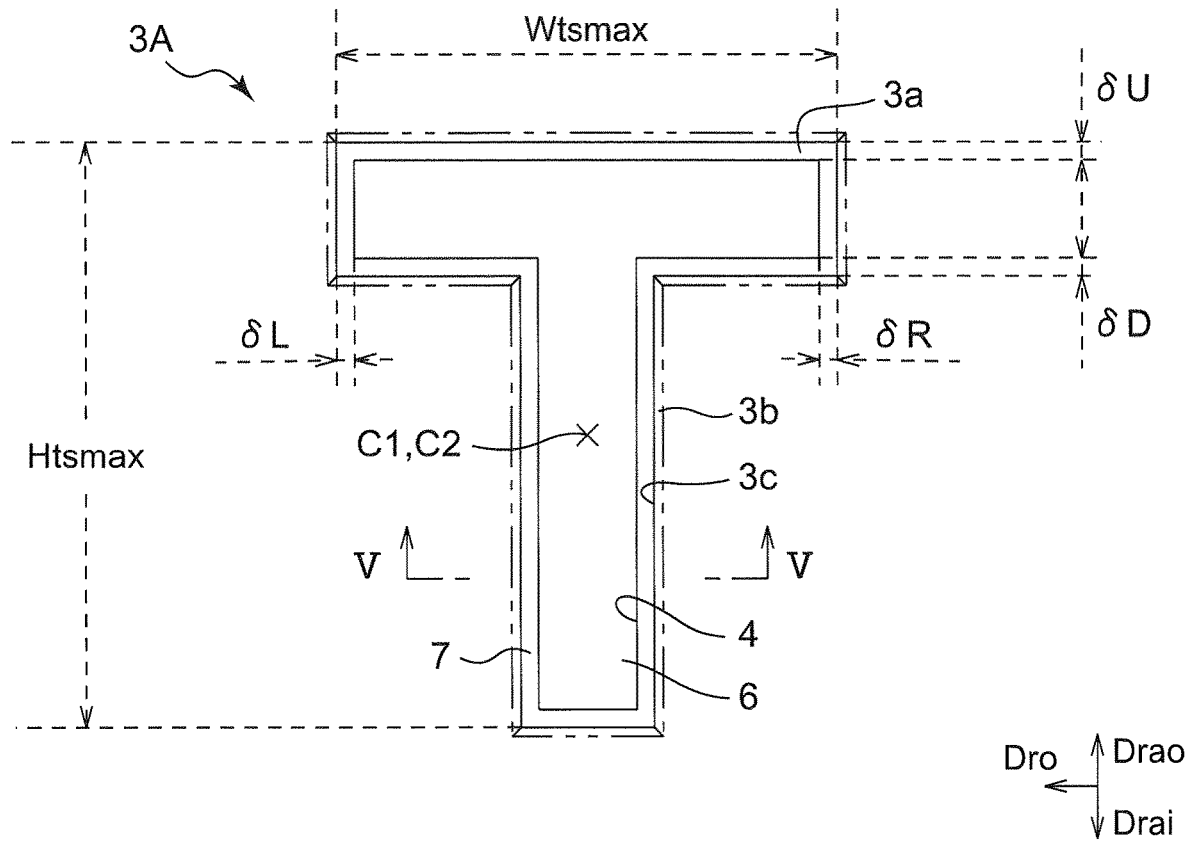
FIG. 4 is a schematic front view of one of projecting portions shown in FIG. 3.
Figure 5:
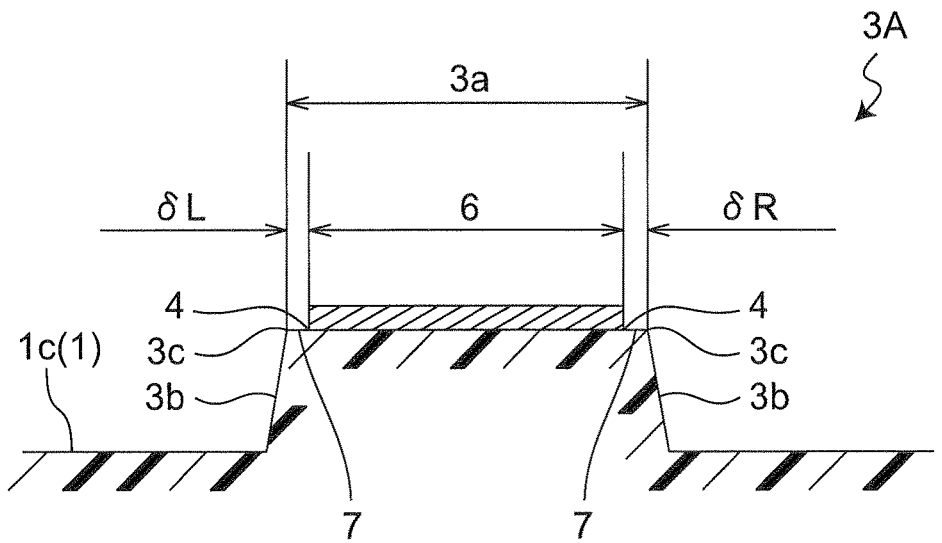
FIG. 5 is sectional view taken along a line V-V of FIG. 4.

To describe this embodiment with reference to FIGS. 4 and 5, the letter "T" expressed by the projecting portion 3A is a figure which does not have a closed portion surrounded by a line (marks such as a capital "Y" of alphabet and the number "2" also belonging to this category). Accordingly, the projecting portion 3A includes an outer side surface 3b which is an inclined surface extending between an outer surface of the side portion 1c and an outer portion of the top surface 3a. An outer edge 3c is formed on an outer peripheral edge of the top surface 3a by the top surface 3a and the outer side surface 3b.

Figure 6:
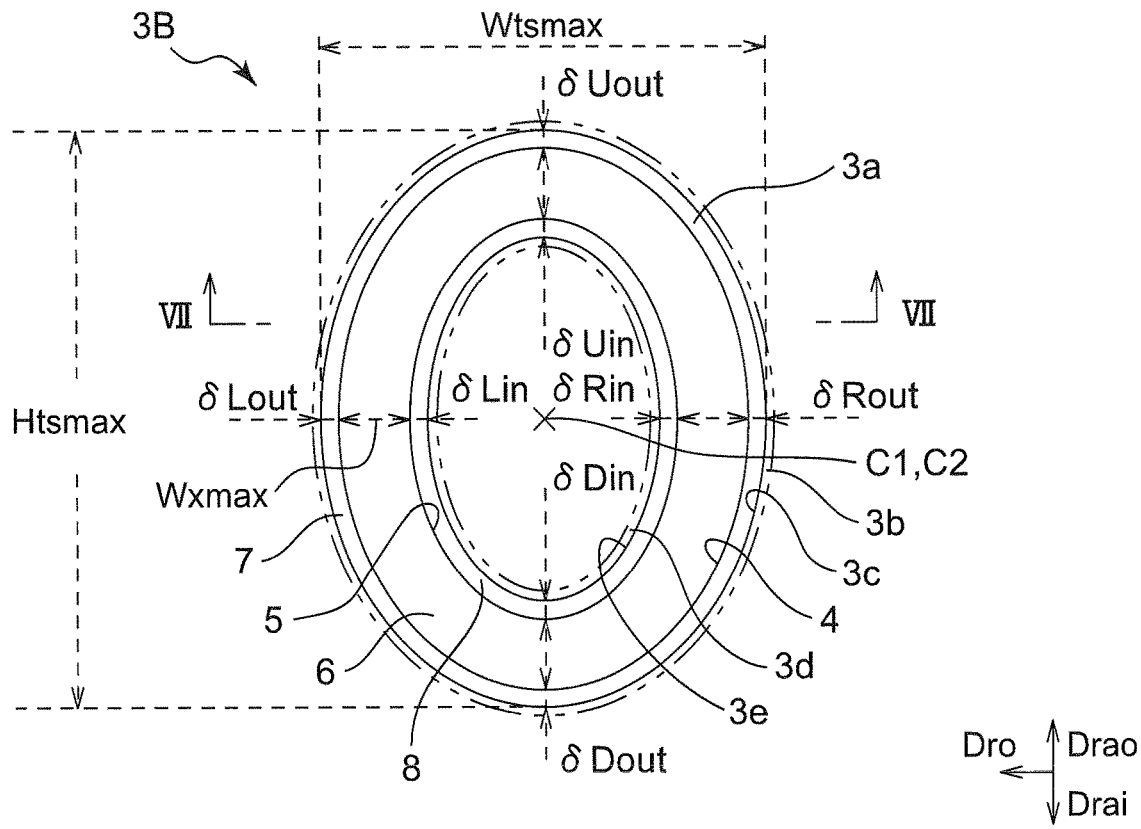
FIG. 6 is a schematic front view of the other of the projecting portions shown in FIG. 3.
Figure 7:
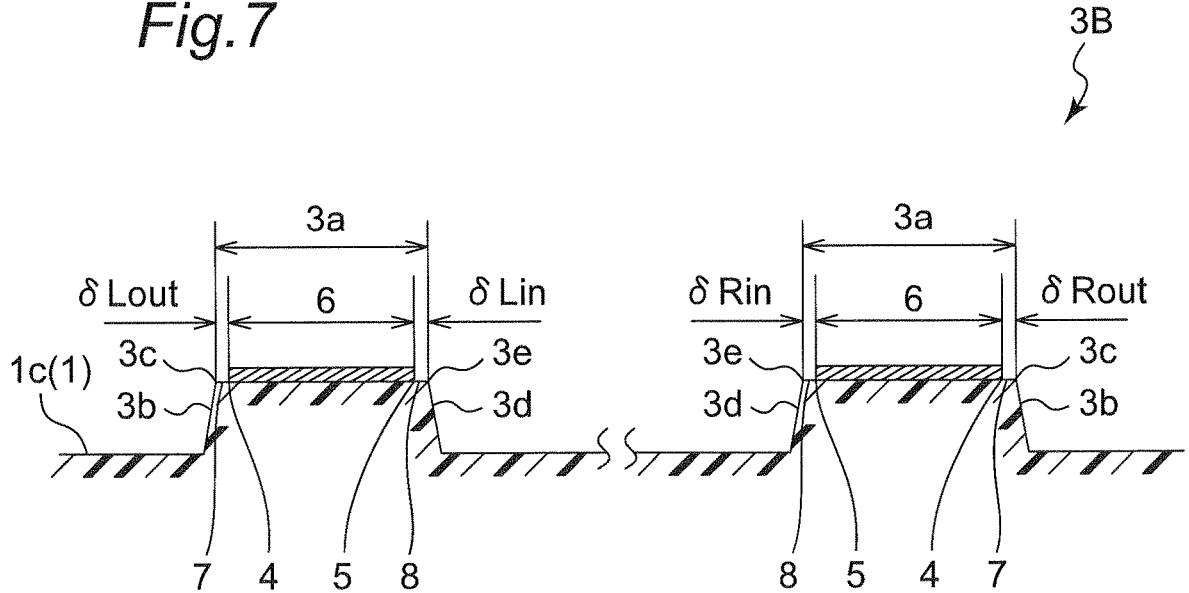
FIG. 7 is a sectional view taken along a ling VII-VII of FIG. 6.

To describe this embodiment with reference to FIGS. 6 and 7, the letter "O" expressed by the projecting portion 3B is a figure which has a closed portion surrounded by a line (marks such as capitals "A" and "R" of alphabet and the number "6" also belonging to this category). Accordingly, the projecting portion 3B includes: an outer side surface 3b which is an inclined surface extending between an outer surface of the side portion 1c and an outer portion of the top surface 3a; and an inner side surface 3d which is an inclined surface extending between the outer surface of the side portion 1c and an inner portion of the top surface 3a. An outer edge 3c is formed on an outer peripheral edge of the top surface 3a by the top surface 3a and the outer side surface 3b. An inner edge 3e is formed on an inner peripheral edge of the top surface 3a by the top surface 3a and the inner side surface 3d.

In this embodiment, both the outer side surface 3b of the projecting portion 3A and the outer side surface 3b and the inner side surface 3d of the projecting portion 3B are formed of a flat surface. However, the outer side surface 3b and the inner side surface 3d may be formed of a curved surface.

To describe this embodiment with reference to FIGS. 4 and 5, an outer profile line 4 which is offset toward a side where a centroid of the top surface 3a (see symbol C1 in FIG. 4) exists with respect to the outer edge 3c or inwardly is set on the top surface 3a of the projecting portion 3A. Since the projecting portion 3A expresses the letter "T", the outer profile line 4 is formed of only straight lines.

To describe this embodiment with reference to FIGS. 6 and 7, an outer profile line 4 which is offset toward a side where a centroid C1 of the top surface 3a exists with respect to the outer edge 3c or inwardly is set on the top surface 3a of the projecting portion 3B. An inner profile line 5 which is offset toward a side where the centroid C1 of the top surface 3a exists with respect to the inner edge 3e or inwardly is set on the top surface 3a of the projecting portion 3B. Since the projecting portion 3B expresses the letter "O", both the outer profile line 4 and the inner profile line 5 are formed of only a curved line.

It is not always necessary that the outer profile line 4 and the inner profile line 5 are formed of a line which is actually depicted on the top surface 3a, and the outer profile line 4 and the inner profile line 5 may be formed of an imaginary line. In this embodiment, a boundary between a colored portion 6 and an outer non-colored portion 7 described later forms the outer profile line 4, and a boundary between the colored portion 6 and an inner non-colored portion 8 forms the inner profile line 5.

To describe this embodiment with reference to FIGS. 4 and 5, with respect to the projecting portion 3A which expresses the letter "T", a distance between the outer profile line 4 and the outer edge 3c in a tire rotating direction Dro is referred to as an offset amount δL. A distance between the outer profile line 4 and the outer edge 3c in the direction opposite to the tire rotating direction Dro is referred to as an offset amount δR. With respect to the projecting portion 3A, a distance between the outer profile line 4 and the outer edge 3c toward the outside in a tire radial direction Drao is referred to as an offset amount δU. A distance between the outer profile line 4 and the outer edge 3c toward the inside in the tire radial direction Drai is referred to as an offset amount δD.

The offset amounts δL and δR in the tire rotating direction Dro are set within a range of 0.5% to 40% of a maximum size (maximum width Wtsmax) of the top surface 3a of the projecting portion 3A in the tire rotating direction Dro. The offset amounts δU and δD in the tire radial directions Drao, Drai are set within a range of 0.5% to 40% of a maximum size (maximum height Htsmax) of the top surface 3a of the projecting portion 3A in the tire radial directions Drao, Drai.

To describe this embodiment with reference to FIGS. 6 and 7, with respect to the projecting portion 3B which expresses the letter "O", a distance between the outer profile line 4 and the outer edge 3c in a tire rotating direction Dro is referred to as an offset amount δLout. A distance between the outer profile line 4 and the outer edge 3c in the direction opposite to the tire rotating direction Dro is referred to as an offset amount δRout. With respect to the projecting portion 3B, a distance between the inner profile line 5 and the inner edge 3e in the tire rotating direction Dro is referred to as an offset amount δLin. A distance between the inner profile line 5 and the inner edge 3e in the direction opposite to the tire rotating direction Dro is referred to as an offset amount δRin.

To also describe this embodiment with reference to FIGS. 6 and 7, with respect to the projecting portion 3B, a distance between the outer profile line 4 and the outer edge 3c toward the outside in the tire radial direction Drao is referred to as an offset amount δUout. A distance between the outer profile line 4 and the outer edge 3c toward the inside in the tire radial direction Drai is referred to as an offset amount δDout. With respect to the projecting portion 3B, a distance between the inner profile line 5 and the inner edge 3e toward the outside in a tire radial direction Drao is referred to as an offset amount δUin. A distance between the inner profile line 5 and the inner edge 3e toward the inside in the tire radial direction Drai is referred to as an offset amount δDin.

The offset amounts δLout, δLin, δRout, and δRin in the tire rotating direction Dro are set within a range of 0.5% to 40% of a maximum size (maximum width Wtsmax) of the top surface 3a of the projecting portion 3B in the tire rotating direction Dro. The offset amounts δUout, δUin, δDout, and δDin in the tire radial directions Drao, Drai are set within a range of 0.5% to 40% of a maximum size (maximum height Htsmax) of the top surface 3a of the projecting portion 3B in the tire radial directions Drao, Drai.

To describe this embodiment with reference to FIG. 4, a colored portion 6 is formed on the top surface 3a of the projecting portion 3A in a region surrounded by the outer profile line 4, and an outer non-colored portion 7 is formed between the outer profile line 4 and the outer edge 3c. In the same manner, to describe this embodiment with reference to FIG. 6, a colored portion 6 is formed on the top surface 3a of the projecting portion 3B in a region surrounded by the outer profile line 4 and the inner profile line 5. Further, an outer non-colored portion 7 is formed on the top surface 3a of the projecting portion 3B between the outer profile line 4 and the outer edge 3c, and an inner non-colored portion 8 is formed between the inner profile line 5 and the inner edge 3e.

The colored portion 6 on the projecting portions 3A, 3B is formed by partially applying printing on the top surface 3a. A printing method for forming the colored portion 6 is not particularly limited. For example, the colored portion 6 is formed by a printing method such as inkjet printing, PAD printing, screen printing, or decal printing. The outer non-colored portion 7 on the projecting portion 3A and the outer non-colored portion 7 and the inner colored portion 6 on the projecting portion 3B are formed by exposing a base color of the tire 1 without applying printing to the top surface 3a.

As shown in FIGS. 8, 9, and 11 to 16, various modes are considered with respect to a ratio of an area of the colored portion 6 to an area of a region surrounded by the outer profile line 4 or the inner profile line 5, and the position where the colored portion 6 is formed on the top surface 3a. Hereinafter, these modes are described. In the examples shown in FIGS. 8, 9, and 11 to 16, a size and a shape of the outer profile line 4 on the projecting portion 3A and sizes and shapes of the outer profile line 4 and the inner profile line 5 on the projecting portion 3B are set equal.

Figure 8:
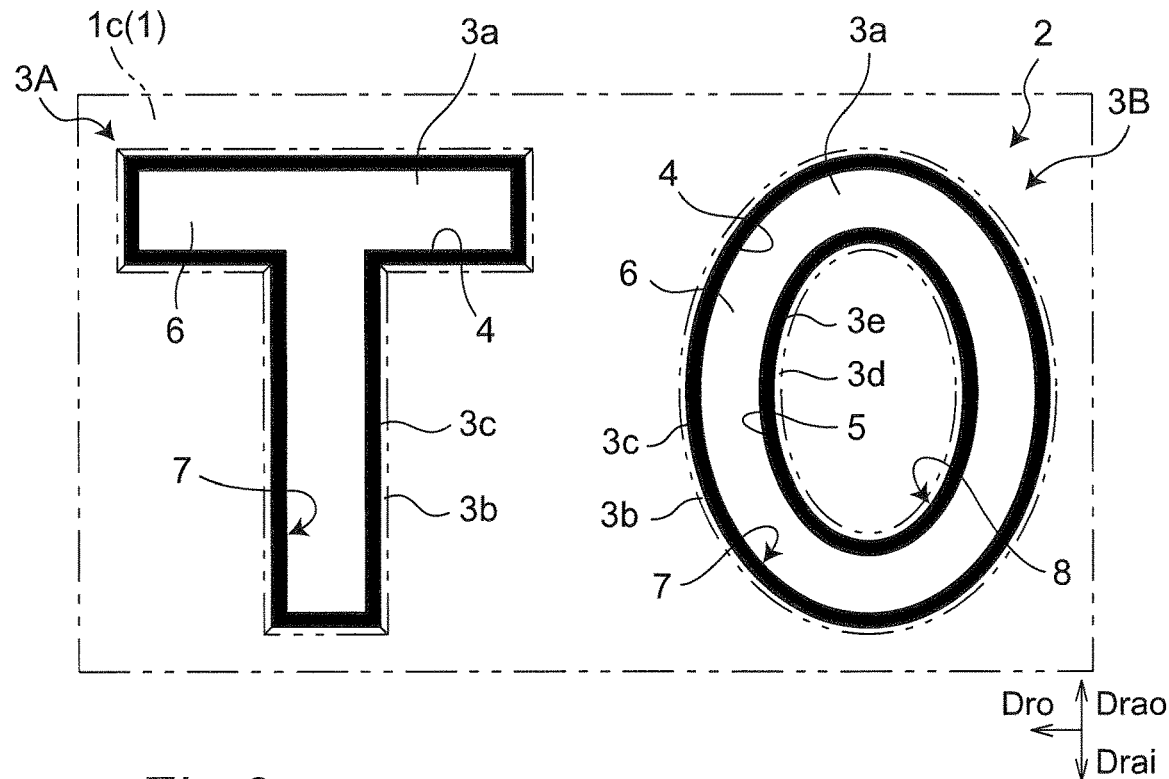
FIG. 8 is a schematic front view of a first example of a display portion.

In the example shown in FIG. 8, the colored portion 6 is formed on the whole region surrounded by the outer profile line 4 on the top surface 3a of the projecting portion 3A. That is, a ratio of the area of the colored portion 6 with respect to the area of the region surrounded by the outer profile line 4 is 100%. In the same manner, in the example shown in FIG. 8, the colored portion 6 is formed on the whole region surrounded by the outer profile line 4 and the inner profile line 5 on the top surface 3a of the projecting portion 3B. That is, a ratio of the area of the colored portion 6 to the area of the region surrounded by the outer profile line 4 and the inner profile line 5 is 100%. Further, the colored portions 6 on the projecting portions 3A, 3B have substantially the uniform hue, brightness, and chroma. In the example shown in FIG. 8, the brightness of the colored portions 6 on the projecting portions 3A, 3B differs from a base color of the tire. To be more specific, although the base color of the tire is black, hues of the colored portions 6 on the projecting portions 3A, 3B are set to white.

The colored portion 6 differs from the base color of the tire with respect to at least one of hue, brightness, and chroma. Provided that a mark can be visually recognized due to such difference, specific hues and the like are not particularly limited. For example, the colored portions 6 on the projecting portions 3A, 3B are not limited to an achromatic color such as white and may be a chromatic color.

To describe this embodiment also with reference to FIGS. 4 and 6, in the example shown in FIG. 8, the centroids C2 of the colored portions 6 on the projecting portions 3A, 3B agree with the centroids C1 of the projecting portions 3A, 3B.

In the example shown in FIG. 8, the outer profile line 4 set on the top surface 3a of the projecting portion 3A extends parallel to the outer edge 3c with respect to both of the tire rotating direction Dro and the tire radial directions Drao, Drai. Further, a distance between the outer profile line 4 on the projecting portion 3A and the outer edge 3c is fixed with respect to both the tire rotating direction Dro and the tire radial directions Drao, Drai. To describe this embodiment also with reference to FIG. 4, offset amounts δR, δL, δU, and δD are equal to each other so that these offset amounts are fixed regardless of the position on the outer profile line 4.

In the example shown in FIG. 8, a distance between the outer profile line 4 set on the top surface 3a of the projecting portion 3B and the outer edge 3c is fixed in all of the tire rotating direction Dro and the tire radial directions Drao, Drai. Further, in the example shown in FIG. 8, a distance between the inner profile line 5 set on the top surface 3a of the projecting portion 3B and the inner edge 3e is fixed in all of the tire rotating direction Dro and the tire radial directions Drao, Drai. To describe this embodiment also with respect to FIG. 6, the offset amounts δLout, δRout, δUout, δDout, δLin, δRin, δUin, and δDin are set equal to each other, and these offset amounts are fixed regardless of the position on the outer profile line 4 and the position on the inner profile line 5.

Figure 9:
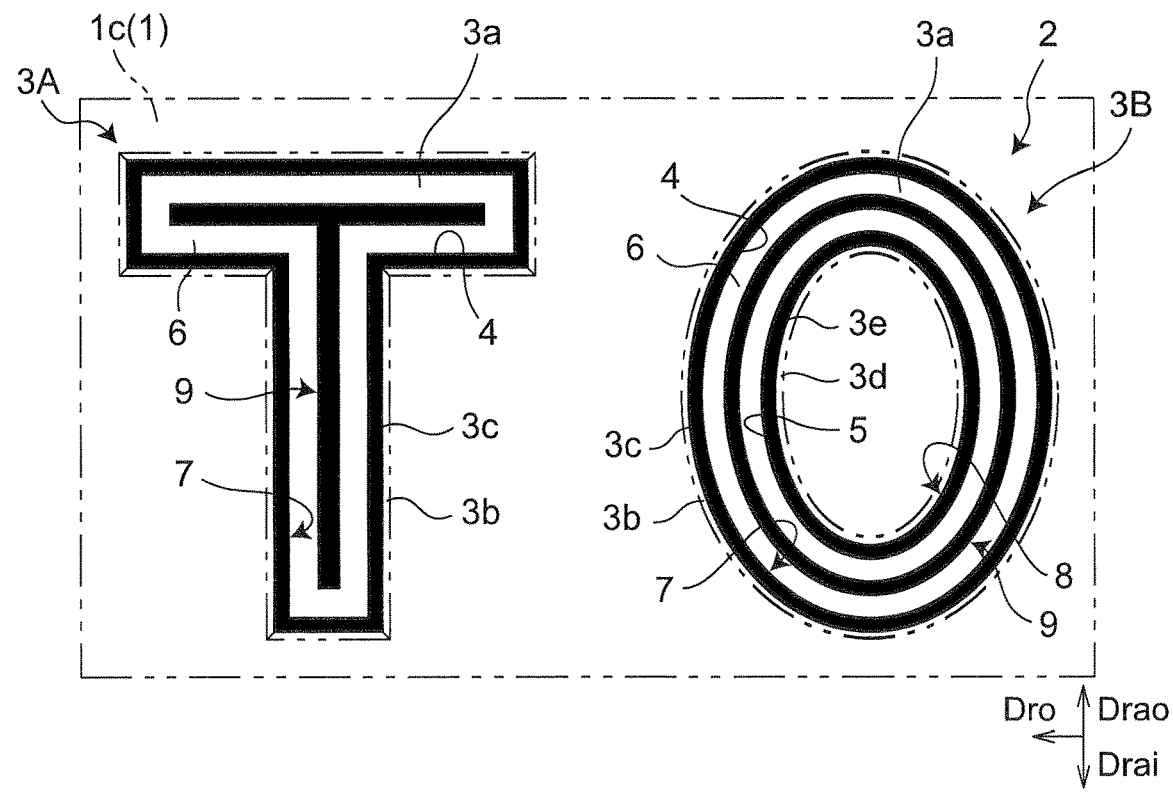
FIG. 9 is a schematic front view of a second example of the display portion.

The example shown in FIG. 9 differs from the example shown in FIG. 8 with respect to a ratio of an area of colored portion 6 on the projecting portion 3A, 3B to the area of the region surrounded by the outer profile line 4 or area of the region surrounded by the inner profile line 5. More specifically, within the colored portions 6 formed on the top surfaces 3a of the projecting portions 3A, 3B, an inner non-colored portion 9 where the base color of the tire 1 is exposed without applying printing on the top surface 3a in the same manner as the outer non-colored portion 7 and the inner non-colored portion 8 is disposed. To ensure visibility, it is preferable to set a ratio of an area of the colored portion 6 to an area of the region surrounded by the outer profile line 4 on the top surface 3a of the projecting portion 3A to 50% or more. Because of a substantially same reason, it is preferable to set a ratio of an area of the colored portion 6 to an area of a region surrounded by the outer profile line 4 and the inner profile line 5 on the top surface 3a of the projecting portion 3B to 50% or more. The example shown in FIG. 9 is substantially equal to the example shown in FIG. 8 with respect to other points.

Figure 10:
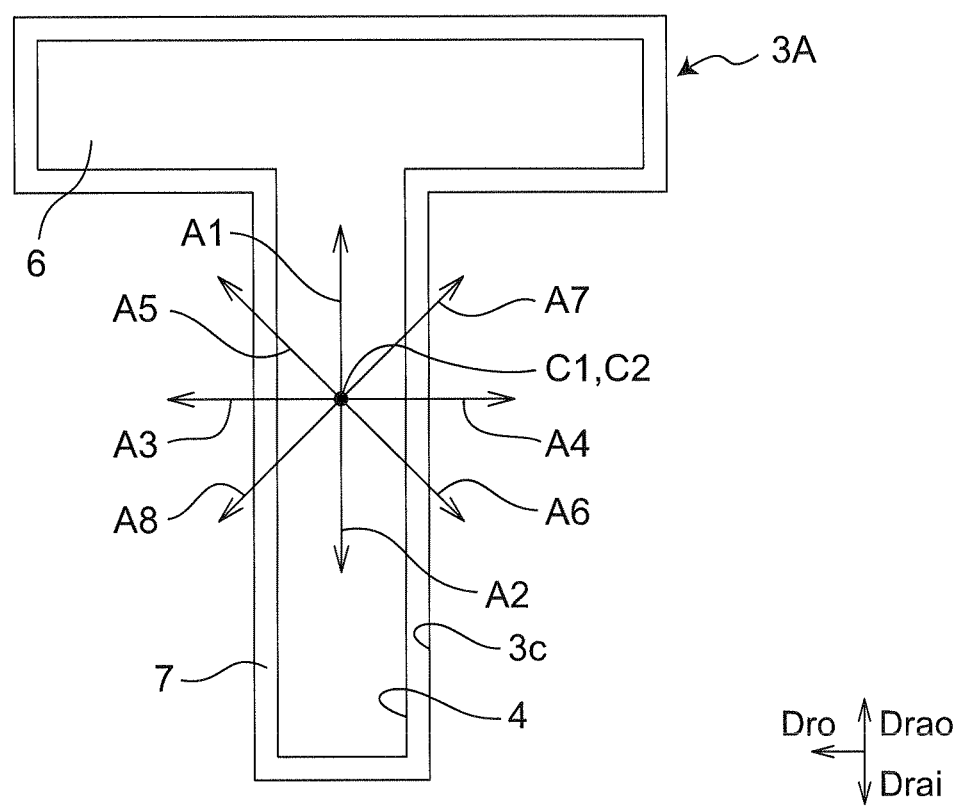
FIG. 10 is a schematic front view of the projecting portion for illustrating a setting position of a colored portion.

In the example shown in FIGS. 11 to 16, as conceptually indicated by arrows A1 to A6 in FIG. 10, the position of the colored portions 6 of the projecting portions 3A, 3B with respect to the centroid C1 of the top surface 3a is offset or shifted from the position in the example shown in FIG. 8 (the centroid C2 of the colored portion 6 and the centroid C1 of the top surface 3a agreeing with each other). The examples shown in FIGS. 11 to 16 are substantially equal to the example shown in FIG. 8 with respect to other points.

Figure 11:
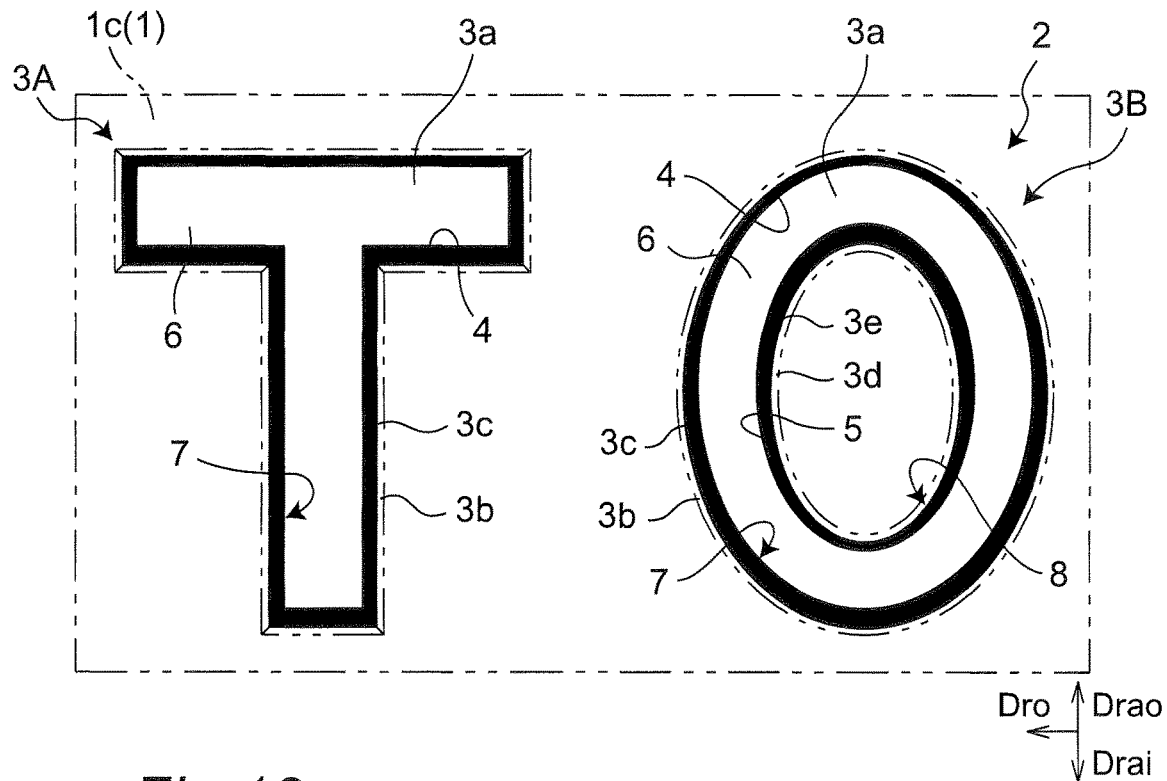
FIG. 11 is a schematic front view of a third example of the display portion.

In the example shown in FIG. 11, the colored portion 6 is offset only toward the outside in the tire radial direction Drao with respect to the centroid C1 of the top surface 3a of the projecting portion 3A, 3B (see an arrow A1 in FIG. 10). To describe this embodiment also with reference to FIGS. 4 and 6, in the example shown in FIG. 11, in the colored portion 6 on the projecting portion 3A, although the offset amounts δR and δL are equal to each other, the offset amount δD is larger than the offset amount δU. Further, in the colored portion 6 on the projecting portion 3B, the offset amounts δRout and δLout are equal to each other, and the offset amounts δRin and δLin are equal to each other. The offset amount δDout is larger than the offset amount δUout and the offset amount δUin is larger than the offset amount δDin.

Figure 12:
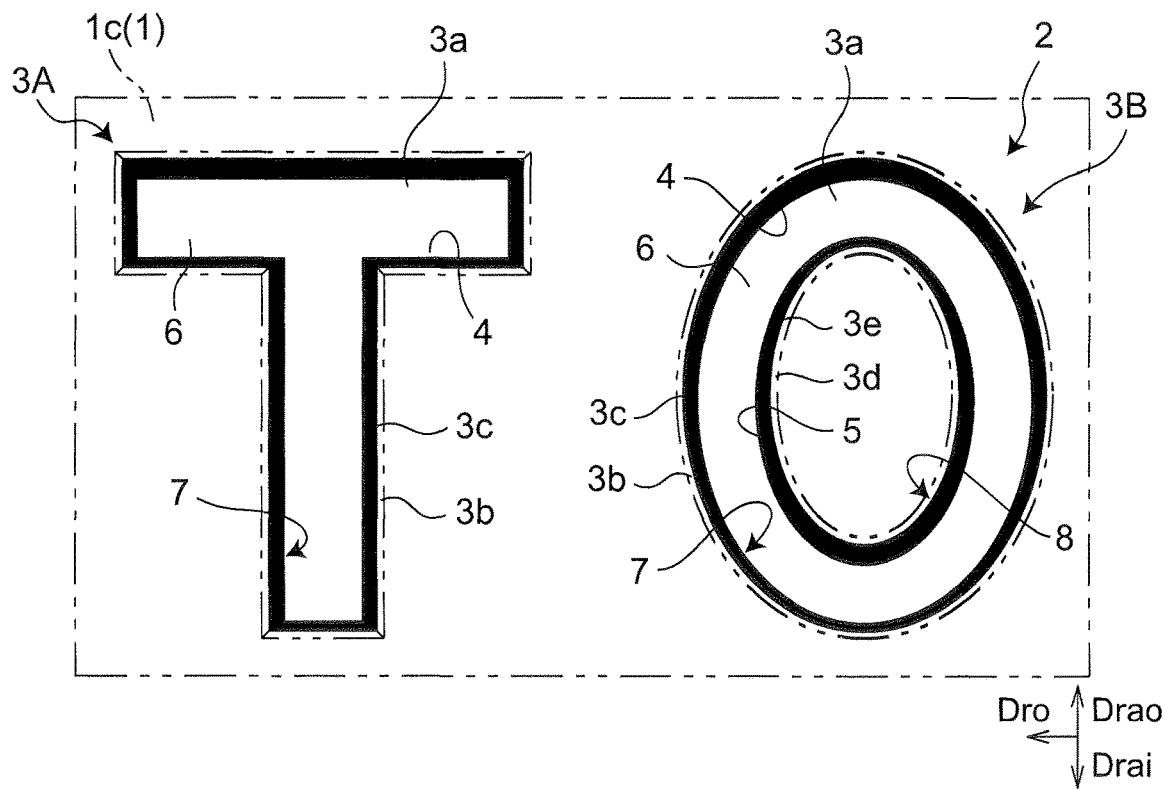
FIG. 12 is a schematic front view of a fourth example of the display portion.

In the example shown in FIG. 12, the colored portion 6 is offset only toward the inside in the tire radial direction Drai with respect to the centroid C1 of the top surface 3a of the projecting portion 3A, 3B (see an arrow A2 in FIG. 10). To describe this embodiment also with reference to FIGS. 4 and 6, in the example shown in FIG. 12, in the colored portion 6 on the projecting portion 3A, although the offset amounts δR and δL are equal to each other, the offset amount δU is larger than the offset amount δD. In the colored portion 6 on the projecting portion 3B, the offset amounts δRout and δLout are equal to each other, and the offset amounts δRin and δLin are equal to each other. The offset amount δUout is larger than the offset amount δDout, and the offset amount δDin is larger than the offset amount δUin.

Figure 13:
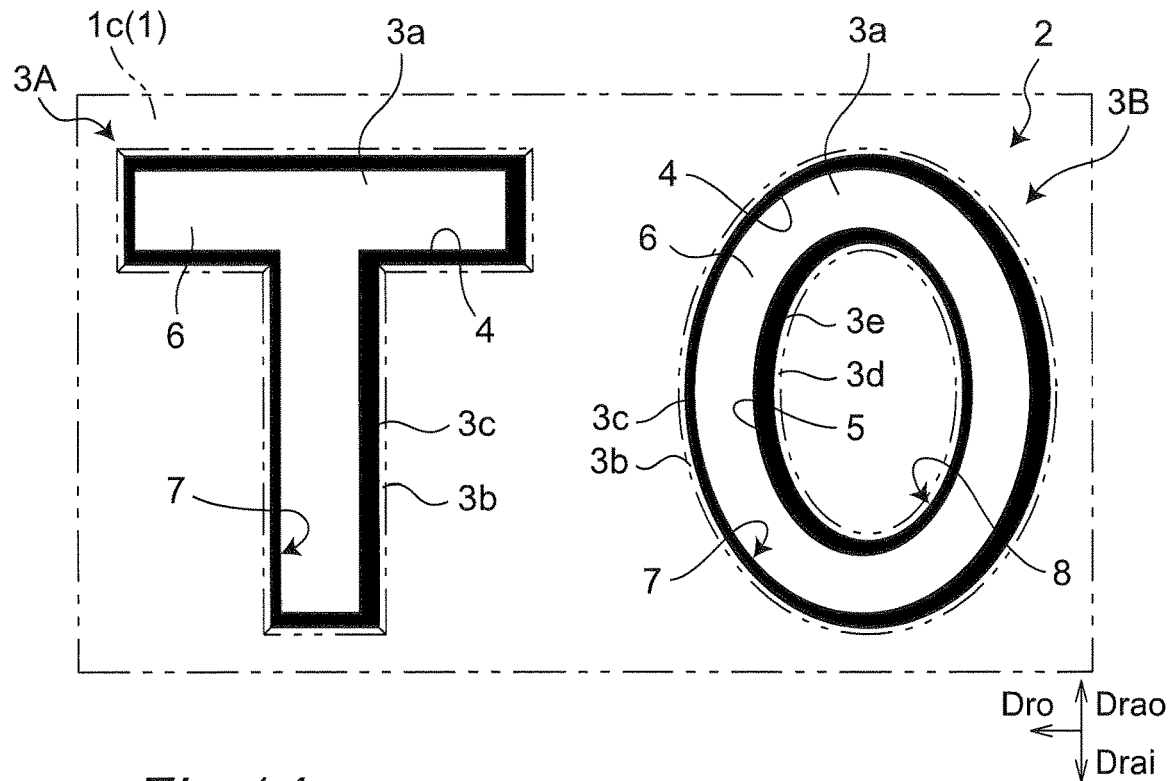
FIG. 13 is a schematic front view of a fifth example of the display portion.

In the example shown in FIG. 13, the colored portion 6 is offset only in the tire rotating direction Dro with respect to the centroid C1 of the top surface 3a of the projecting portion 3A, 3B (see an arrow A3 in FIG. 10). To describe this embodiment also with reference to FIGS. 4 and 6, in the example shown in FIG. 13, in the colored portion 6 on the projecting portion 3A, although the offset amounts δU and δD are equal to each other, the offset amount δR is larger than the offset amount δL. In the colored portion 6 on the projecting portion 3B, the offset amounts δUout and δDout are equal to each other, and the offset amounts δUin and δDin are equal to each other. The offset amount δRout is larger than the offset amount δLout, and the offset amount δLin is larger than the offset amount δRin.

Figure 14:
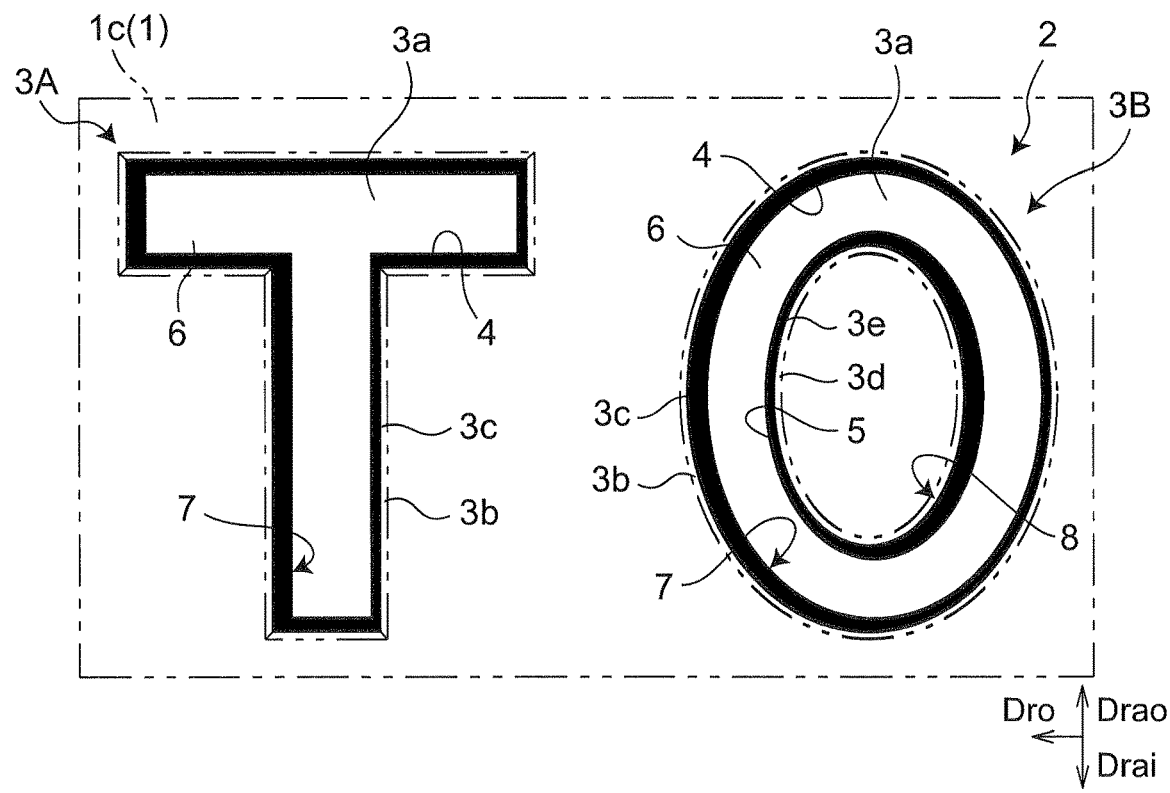
FIG. 14 is a schematic front view of a sixth example of the display portion.

In the example shown in FIG. 14, the colored portion 6 is offset only in the direction opposite to the tire rotating direction Dro with respect to the centroid C1 of the top surface 3a of the projecting portion 3A, 3B (see an arrow A4 in FIG. 10). To describe this embodiment also with reference to FIGS. 4 and 6, in the example shown in FIG. 14, in the colored portion 6 on the projecting portion 3A, although the offset amounts δU and δD are equal to each other, the offset amount δL is larger than the offset amount δR. In the colored portion 6 on the projecting portion 3B, the offset amounts δUout and δDout are equal to each other, and the offset amounts δUin and δDin are equal to each other. The offset amount δLout is larger than the offset amount δRout and the offset amount δRin is larger than the offset amount δLin.

Figure 15:
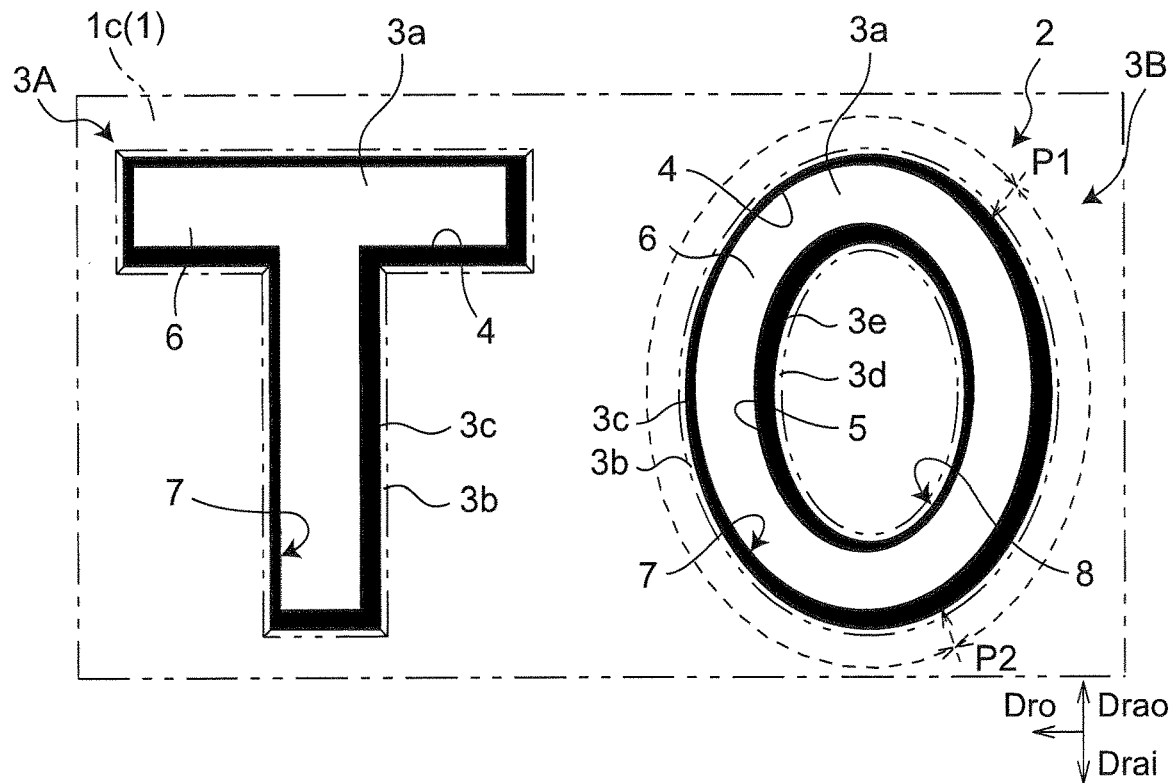
FIG. 15 is a schematic front view of a seventh example of the display portion.

In the example shown in FIG. 15, the colored portion 6 is offset toward the outside in the tire radial direction Drao and in the tire rotating direction Dro with respect to the centroid C1 of the top surface 3a of the projecting portion 3A, 3B (see an arrow A5 in FIG. 10). To describe this embodiment also with reference to FIGS. 4 and 6, in the example shown in FIG. 15, in the colored portion 6 on the projecting portion 3A, the offset amount δD is larger than the offset amount δU, and the offset amount δR is larger than the offset amount δL. In the colored portion 6 on the projecting portion 3B, an offset amount of the outer profile line 4 with respect to the outer edge 3c is increased toward the position P2 from the position P1 shown in FIG. 15.

Figure 16:
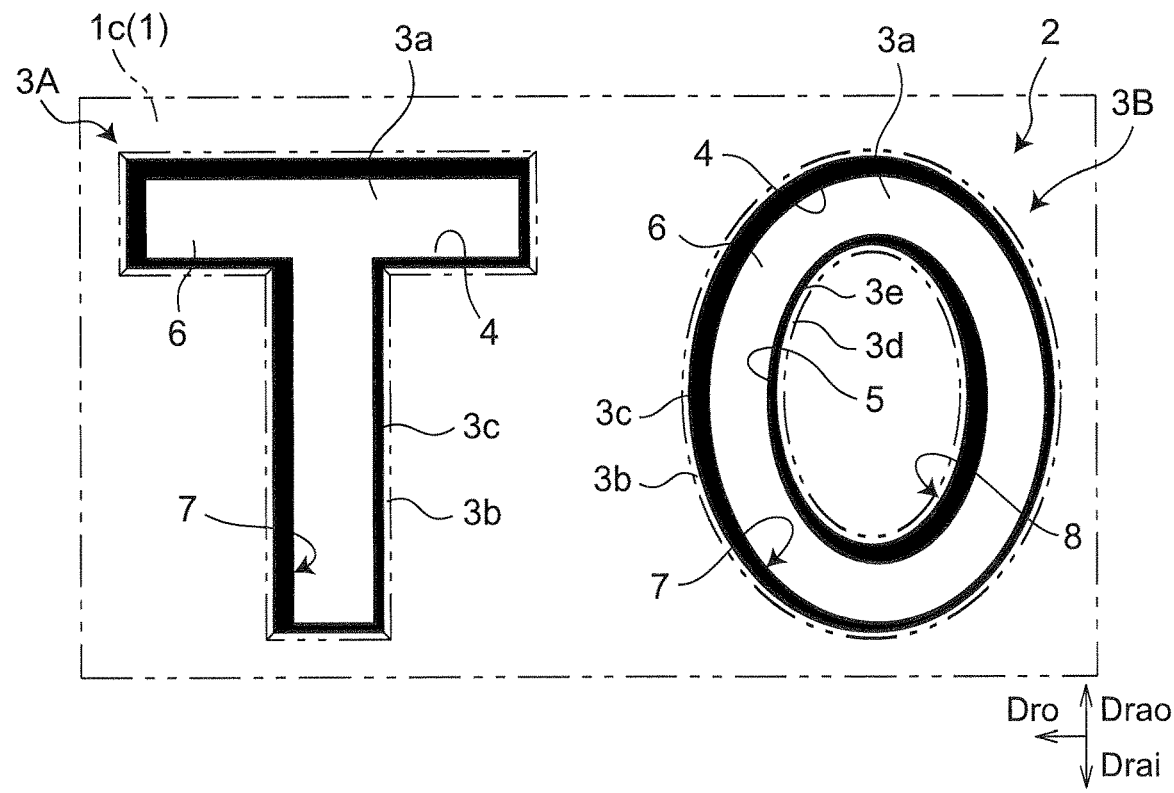
FIG. 16 is a schematic front view of an eighth example of the display portion.

In the example shown in FIG. 16, the colored portion 6 shifted toward the inside in the tire radial direction Drai and in the direction opposite to the tire rotating direction Dro with respect to the centroid of the top surface 3a of the projecting portion 3A, 3B (see an arrow A6 in FIG. 10). To describe this embodiment also with reference to FIGS. 4 and 6, in the example shown in FIG. 16, in the colored portion 6 on the projecting portion 3A, the offset amount δU is larger than the offset amount δD and the offset amount δL is larger than the offset amount δR.

In FIG. 10, the colored portion 6 may be offset or shifted in the direction indicated by an arrow A7 or A8 with respect to the centroid C1 of the top surface 3a of the projecting portion 3A, 3B.

(Evaluation Test 1)

The following Table 1 shows a result of evaluation on visibility of tires on which the projecting portions 3A, 3B shown in FIGS. 8, and 11 to 15 were respectively formed. In the evaluation test, each tire was mounted on a vehicle, and the visibility (three-dimensional appearance, clear appearance) as viewed from a position away from the tire by 1 m was evaluated with an index of the case shown in FIG. 8 set as 100.

TABLE 1

| Drawing number | FIG. 8 | FIG. 11 | FIG. 12 | FIG. 13 | FIG. 14 | FIG. 15 |
| --- | --- | --- | --- | --- | --- | --- |
| Visibility | 100 | 104 | 103 | 104 | 103 | 105 |

As can be explicitly understood from Table 1, whichever direction of the tire radial direction Drao, Drai, and the tire rotating direction Dro the colored portion 6 is offset with respect the centroid of the top surface 3a, the improvement of visibility was recognized. Particularly, offsetting the colored portion 6 both toward the outside in the tire radial direction Drao and in the tire rotating direction Dro as shown in FIG. 15 mostly improved visibility.

The projecting portions 3A, 3B which form the display portion 2 formed on the side portion 1c of the tire 1 according to the embodiment have the following technical features particularly.

Firstly, the colored portion 6 on the projecting portion 3A, 3B is not formed on the whole top surface 3a. That is, in the projecting portion 3A, the colored portion 6 is formed in the region defined by the outer profile line 4 offset with respect to the outer edge 3c. The outer non-colored portion 7 where a base color of the tire is exposed is formed between the colored portion 6 and the outer edge 3c. In the projecting portion 3B, the colored portion 6 is formed in a region defined by the outer profile line 4 offset with respect to the outer edge 3c and the inner profile line 5 offset with respect to the inner edge 3e. The outer non-colored portion 7 and the inner non-colored portion 8 where a base color of the tire is exposed are formed between the colored portion 6 and the outer edge 3c and between the colored portion 6 and the inner edge 3e respectively. Therefore, it is unnecessary to apply a color to the outer edge 3c and the inner edge of the projecting portion 3A, 3B, and it is also unnecessary to apply a color to the outer side surface 3b and the inner side surface 3d of the projecting portion 3A, 3B. Accordingly, positional accuracy which is required in printing or the like for providing the colored portion 6 can be reduced.

The outer non-colored portion 7 and the inner non-colored portion 8 where a base color of the tire is exposed are formed between the colored portion 6 and the outer edge 3c and between the colored portion 6 and the inner edge 3e respectively. The outer non-colored portion 7 and the inner non-colored portion 8 appear like a profile having the base color of the tire 1 provided around the colored portion 6. There is the large difference in brightness between the colored portion 6 and the outer non-colored portion 7 (base color of the tire) and between the colored portion 6 and the inner non-colored portion 8 (base color of the tire). The difference in hue and the difference in chroma are also large between the colored portion 6 and the outer non-colored portion 7 and between the colored portion 6 and the inner non-colored portion 8. Accordingly, it is possible to impart the three-dimensional appearance to a mark expressed by the projecting portions 3A, 3B and hence, the visibility is enhanced. Particularly, compared to a case where the whole top surface 3a of the projecting portion 3A, 3B is colored, the visibility is enhanced although an area to be colored is small.

Even when the colored portion 6 is removed due to peeling or the like which is caused by contacting of the side portion 1c with a curbstone, the tire 1 can maintain a function of displaying a mark due to a shape of the top surface 3a of the projecting portion 3A, 3B.

Hereinafter, second to fifth embodiments of the present invention are described. In these embodiments, out of the projecting portions 3A, 3B which form the display portion 2 in the first embodiment (see FIG. 8, for example), the description is made by taking one projecting portion 3A as an example. In the second to fifth embodiments, the constitutional parts of which are not particularly referred are substantially equal to the corresponding constitutional parts of the first embodiment.

Second Embodiment

Figure 17:
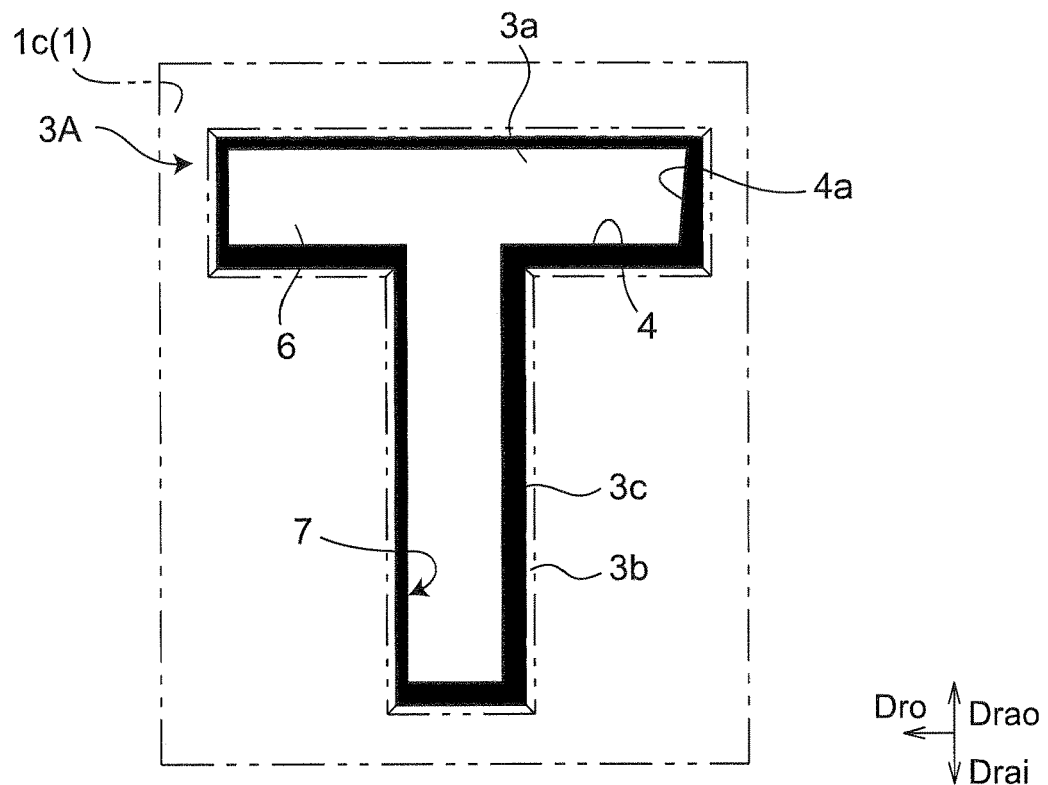
FIG. 17 is a schematic front view of a projecting portion according to a second embodiment of the present invention.

FIG. 17 shows the second embodiment of the present invention. The position of an outer profile line 4 with respect to a centroid C1 of a top surface 3a of a projecting portion 3A in this embodiment is substantially equal to the corresponding position of an outer profile line 4 in FIG. 15. In the first embodiment, all portions of the outer profile line 4 which forms a boundary between a colored portion 6 and an outer non-colored portion 7 are parallel to an outer edge 3c. In this embodiment, in the outer profile line 4 which forms the boundary between the colored portion 6 and the outer non-colored portion 7, a portion indicated by symbol 4a is inclined with respect to a portion of the outer edge 3c which faces this portion 4a in an opposed manner in a tire rotating direction Dro. By inclining at least the portion of the outer profile line 4 with respect to the corresponding portion of the outer edge 3c, it is possible to impart a more three-dimensional appearance to a mark expressed by the projecting portion 3A so that the visibility of the mark can be enhanced.

An angle of inclination of the outer profile line 4 with respect to the outer edge 3c is set to 20° in this embodiment (FIG. 17). However, the angle may be set to a value which falls within a range exceeding 0° and less than 90°. All portions of the outer profile line 4 which forms a boundary between the colored portion 6 and the outer non-colored portion 7 may be inclined with respect to the outer edge 3c. Further, for example, in the projecting portion 3B shown in FIG. 8, a portion or the whole inner profile line 5 which forms the boundary between the colored portion 6 and the inner non-colored portion 8 may be inclined with respect to the inner edge 3e.

Third Embodiment

Figure 18:
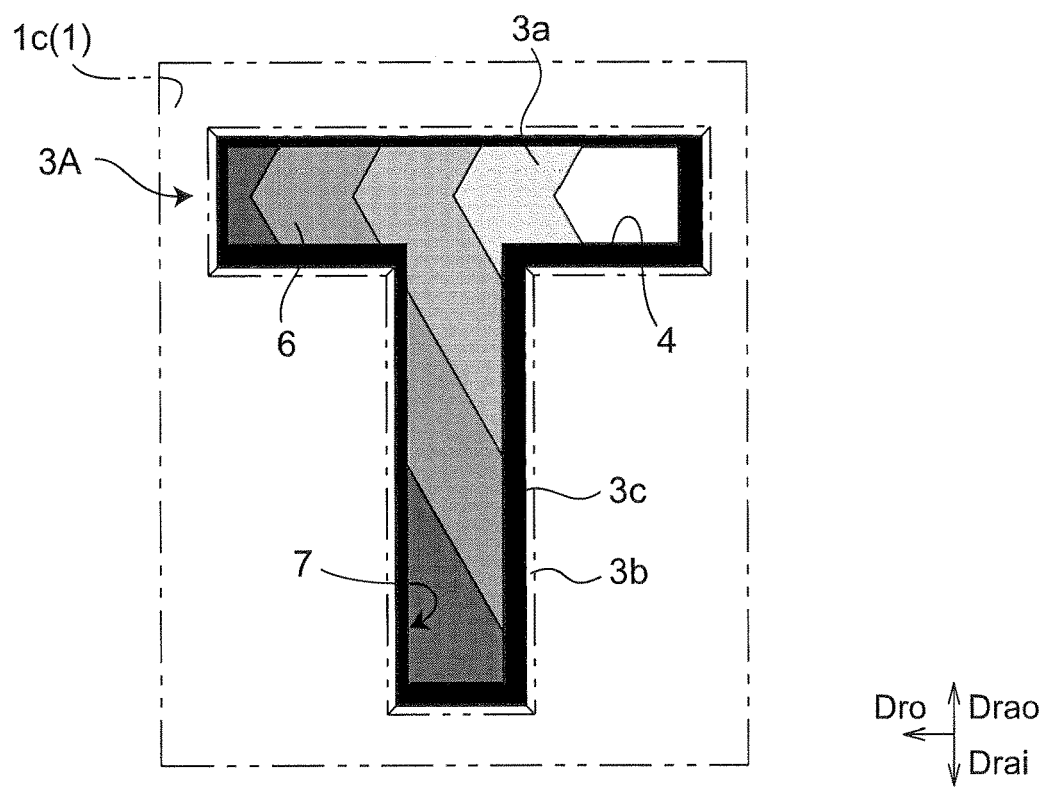
FIG. 18 is a schematic front view of a projecting portion according to a third embodiment of the present invention.

FIG. 18 shows the third embodiment of the present invention. The position of an outer profile line 4 with respect to a centroid C1 of a top surface 3a of a projecting portion 3A in this embodiment is substantially equal to the corresponding position of an outer profile line 4 in FIG. 15. In this embodiment, the colored portion 6 has a gradation pattern where at least one of hue, brightness and chroma continuously changes in the tire rotating direction Dro. By providing the colored portion 6 with the gradation where hue or the like changes in the tire rotating direction Dro, a mark expressed by the projecting portion 3A can acquire a more three-dimensional appearance and hence, the visibility can be further enhanced.

Fourth Embodiment

Figure 19:
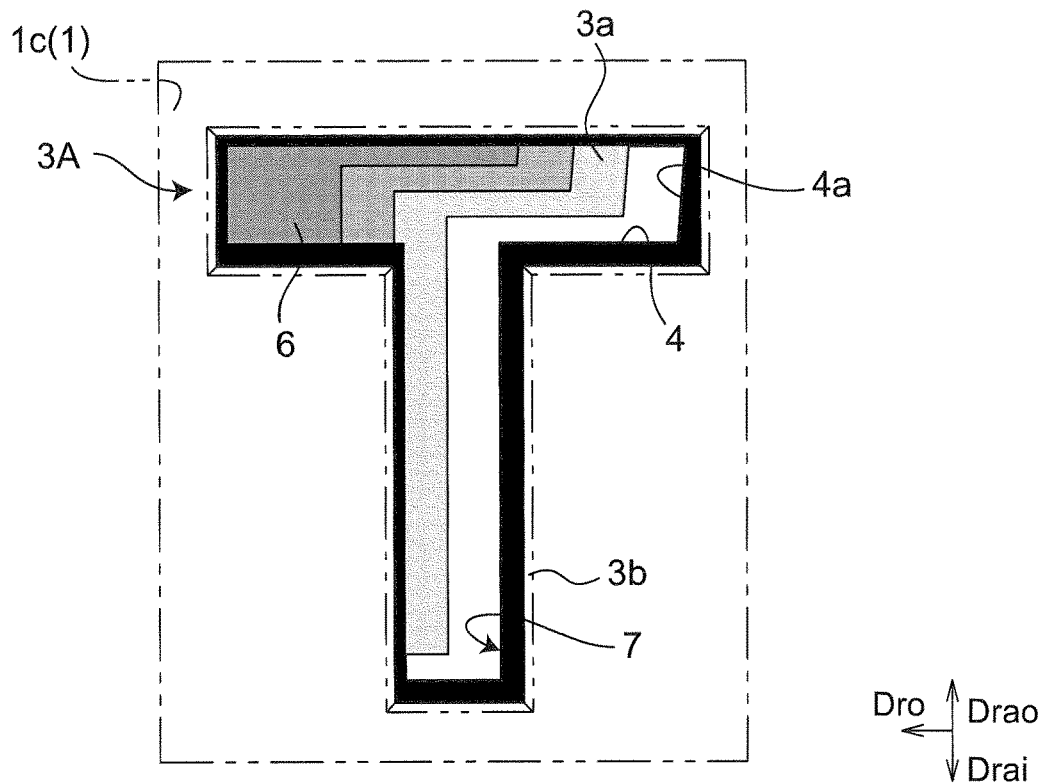
FIG. 19 is a schematic front view of a projecting portion according to a fourth embodiment of the present invention.

FIG. 19 shows the fourth embodiment of the present invention. The position of an outer profile line 4 with respect to a centroid C1 of a top surface 3a of a projecting portion 3A in this embodiment is substantially equal to the corresponding position of an outer profile line 4 in FIG. 15. In this embodiment, in the same manner as the second embodiment, in an outer profile line 4 which forms a boundary between a colored portion 6 and an outer non-colored portion 7, a portion 4a is inclined with respect to a portion of an outer edge 3c which faces this portion 4a in an opposed manner in a tire rotating direction Dro. Further, the colored portion 6 has a gradation pattern where at least one of hue, brightness and chroma continuously changes in the tire rotating direction Dro. By partially inclining the portion 4a of the outer profile line 4 and by providing the colored portion 6 with the gradation in the tire rotating direction Dro, a mark expressed by the projecting portion 3A can acquire a more three-dimensional appearance and hence, the visibility can be further enhanced.

Fifth Embodiment

Figure 20:
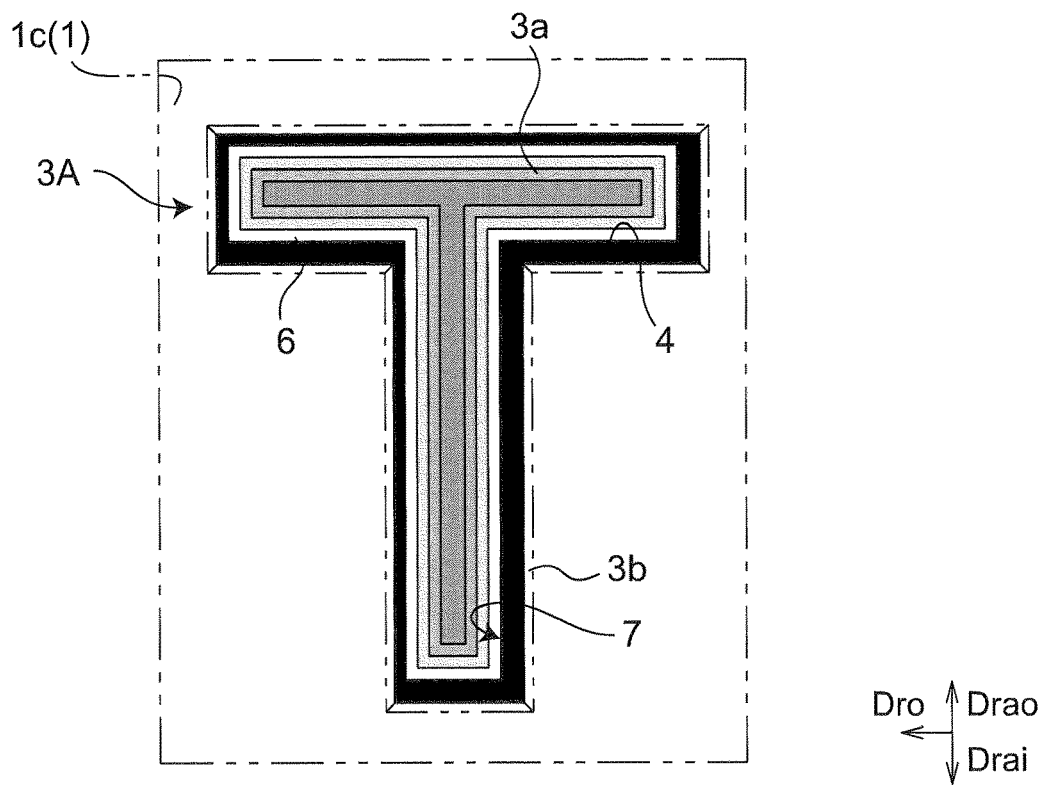
FIG. 20 is a schematic front view of a projecting portion according to a fifth embodiment of the present invention.

FIG. 20 shows the fifth embodiment of the present invention. The position of an outer profile line 4 with respect to a centroid C1 of a top surface 3a of a projecting portion 3A in this embodiment is substantially equal to the corresponding position of an outer profile line 4 in FIG. 15. In this embodiment, the colored portion 6 has a gradation pattern where at least one of hue, brightness and chroma continuously changes toward an outer profile line 4 from a centroid C2 (see FIG. 4). By providing the colored portion 6 with the gradation which changes toward the outside from the center of the colored portion 6, a mark expressed by the projecting portion 3A can acquire a more three-dimensional appearance and hence, the visibility can be further enhanced.

The colored portion 6 on the projecting portion 3A in the third to fifth embodiments (FIGS. 18 to 20) has the gradation where hue or the like continuously changes. However, a stepwise or non-continuous change which is not included in a category of gradation may be imparted to at least one of hue, brightness and chroma of the colored portion 6. Even with such a stepwise or non-continuous change in hue or the like, a mark expressed by the projecting portion 3A can acquire a more three-dimensional appearance and hence, the visibility can be further enhanced.

(Evaluation Test 2)

Visibility of marks formed of projecting portions adopted by the embodiments of the present invention (examples 1 to 7) were evaluated. More specifically, each tire was mounted on a vehicle, and the visibility (three-dimensional appearance, clear appearance) as viewed from a position away from the tire by 1 m was evaluated. Comparative examples 1 to 3 were also evaluated for a comparison purpose with the examples 1 to 8.

Figure 21:
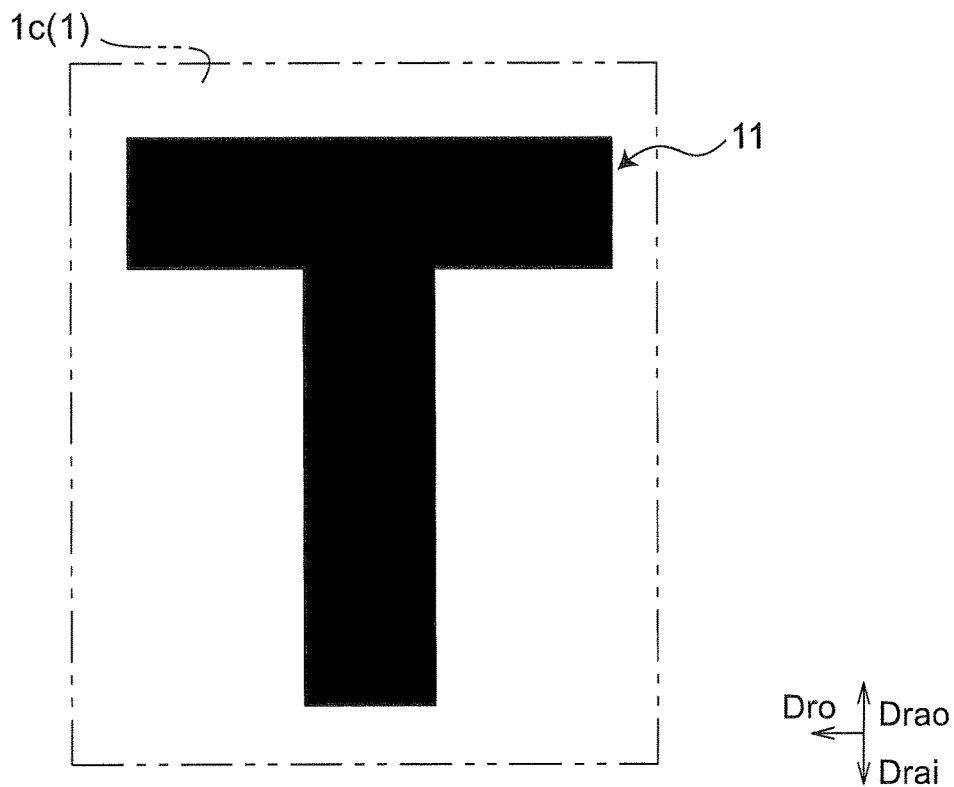
FIG. 21 is a schematic front view of a mark of comparative example 1.
Figure 22:
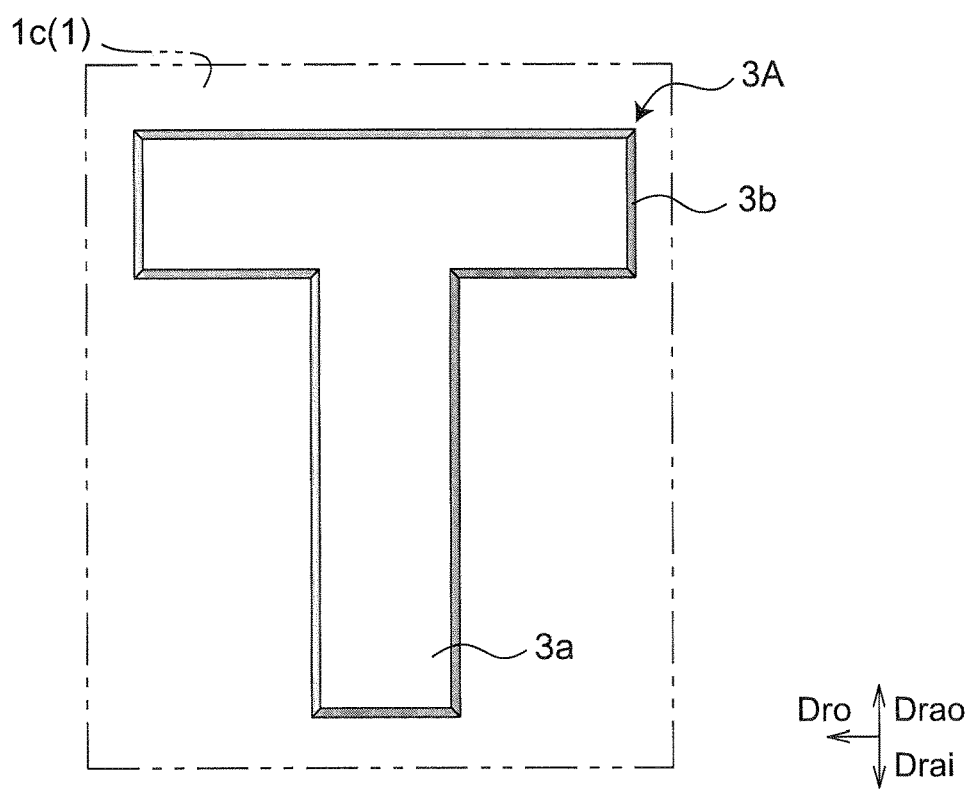
FIG. 22 is a schematic front view of a mark of comparative example 2.
Figure 23:
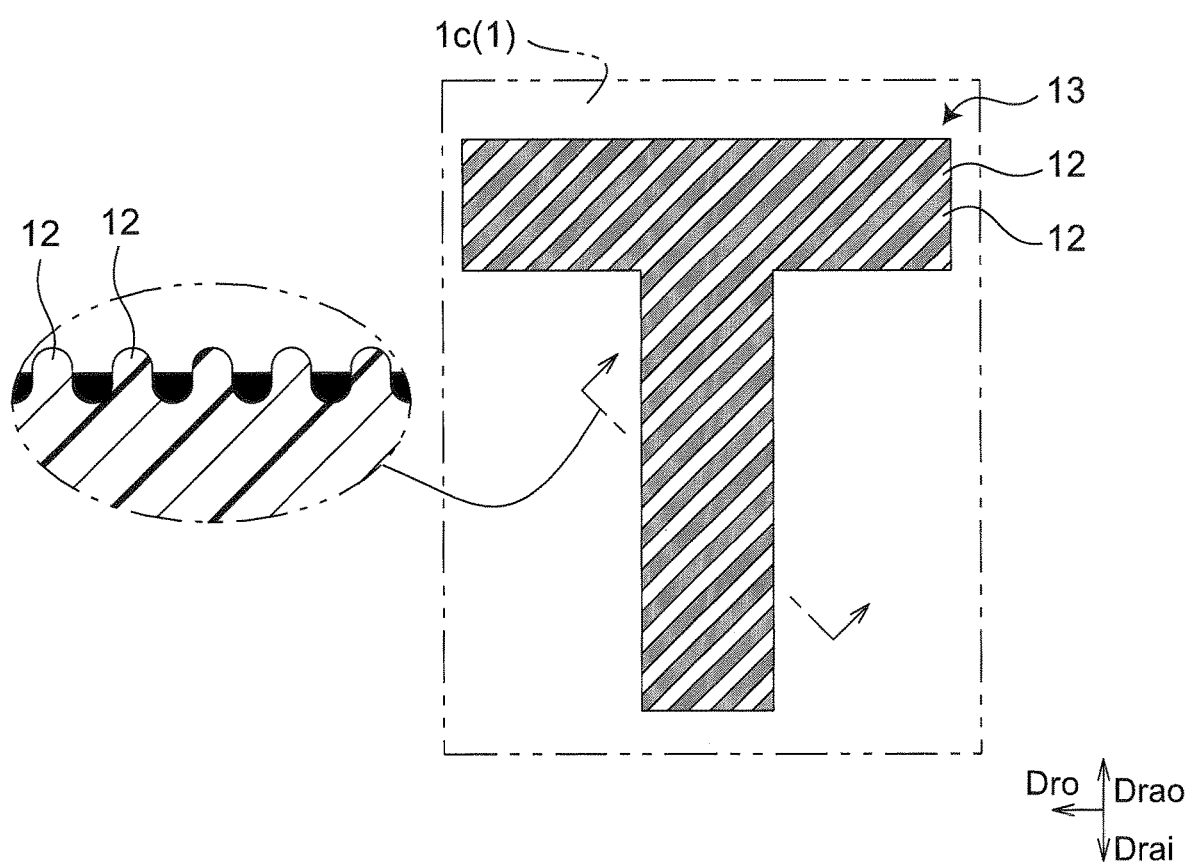
FIG. 23 is a schematic front view of a mark of comparative example 3.

The comparative example 1 is, as shown in FIG. 21, a mark 11 where a capital "T" of alphabet is expressed by directly applying a color different from a base color of a tire to a side portion 1c. The comparative example 2 is, as shown in FIG. 22, a projecting portion 3A where a color is applied to only an outer side surface 3b. The comparative example 3 is, as shown in FIG. 23, a mark 13 where a capital "T" of alphabet is expressed by applying a color to bottom portions formed between serrations 12 formed on a side portion 1c.

The example 1 is the projecting portion 3A shown in FIG. 8 (hue and the like of the colored portion 6 being fixed) where all offset amounts δL, δR, δU, and δD are set to 0.6 mm.

The example 2 is the projecting portion 3A shown in FIG. 15 (hue and the like of the colored portion 6 being fixed) where offset amounts δL and δU are set to 0.4 mm and offset amounts δR and δD are set to 0.8 mm.

The example 3 is the projecting portion 3A shown in FIG. 17 (hue and the like of the colored portion 6 being fixed) where offset amounts are set in the same manner as the example 1 except for the portion 4a.

The example 4 is the projecting portion 3A shown in FIG. 18 (the colored portion 6 having gradation in the tire rotating direction) where offset amounts are set in the same manner as the example 1.

The example 5 is the projecting portion 3A shown in FIG. 19 (the colored portion 6 having gradation in the tire rotating direction) where offset amounts are set in the same manner as the example 2.

The example 6 is the projecting portion 3A shown in FIG. 20 (the colored portion 6 having gradation toward the outside from the center) where offset amounts are set in the same manner as the example 1.

The example 7 is the projecting portion 3B shown in FIG. 15 (hue and the like of the colored portion 6 being fixed).

An average value of brightness difference and visibility of a mark were evaluated with an index of the case of the comparative example 1 set as 100 except for the example 7. In the example 7, an average value of brightness difference and visibility of a mark were evaluated with an index of a case of a mark expressing a capital "O" of alphabet having the configuration similar to the configuration of the comparative example 1 as 100 (FIG. 21). A result of evaluation is shown in Table 2 to Table 4. Each area ratio shown in these tables indicate a ratio of an area of a colored portion to an area of a mark. For example, in case of the examples 1 to 6, an area ratio is a ratio of an area of the colored portion 6 to an area of the top surface 3a of the projecting portion 3A.

TABLE 2

|  | Comparative example 1 (FIG. 21) | Comparative example 2 (FIG. 22) | Comparative example 3 (FIG. 23) |
| --- | --- | --- | --- |
| Area ratio (%) | 100 | 30 | 70 |
| Average value of brightness difference | 100 | 90 | 95 |
| Visibility | 100 | 95 | 98 |

TABLE 3

|  | Example 1 (FIG. 8) | Example 2 (FIG. 15) | Example 3 (FIG. 17) | Example 4 (FIG. 18) |
| --- | --- | --- | --- | --- |
| Area ratio (%) | 90 | 90 | 85 | 85 |
| Average value of brightness difference | 93 | 100 | 102 | 104 |
| Visibility | 96 | 100 | 101 | 101 |

TABLE 4

|  | Example 5 (FIG. 19) | Example 6 (FIG. 20) | Example 7 (FIG. 15) |
| --- | --- | --- | --- |
| Area ratio (%) | 85 | 85 | 90 |
| Average value of brightness difference | 104 | 104 | 104 |
| Visibility | 102 | 102 | 102 |

In spite of the fact that the area ratio of the example 1 was so smaller than the area ratio of the comparative example 1 (FIG. 21) by 15%, it is ascertained that the visibility of the example 1 was 96 while visibility of the comparative example 1 is 100 so that the example 1 has sufficient visibility. In spite of the fact that the area ratios of the example 2 to the example 7 were smaller than the area ratio of the comparative example 1, it is ascertained that the example 2 to the example 7 have the substantially equal visibility or more as the comparative examples 1 to 3.

Sixth Embodiment

Figure 24:
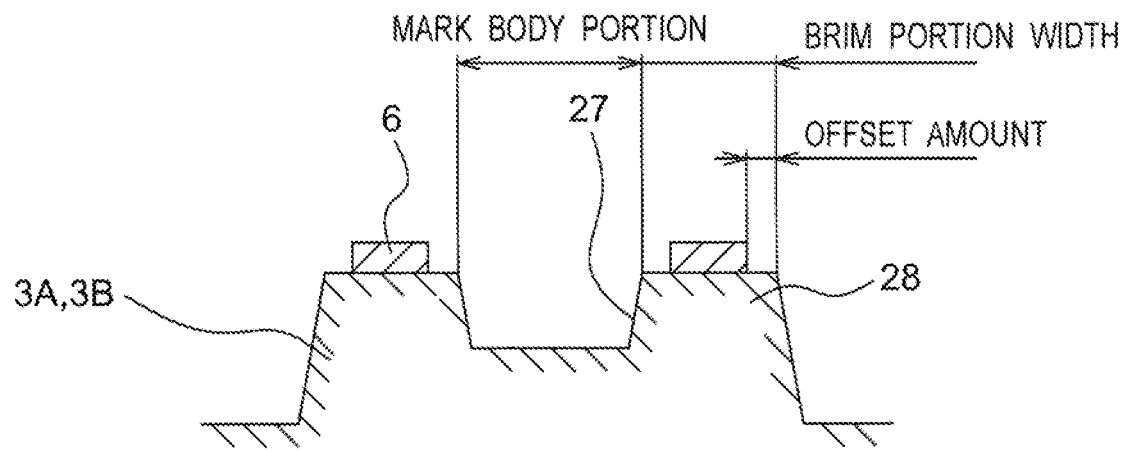
FIG. 24 is a sectional view similar to FIG. 5 showing a projecting portion

As shown in FIG. 24, a recessed portion 27 is formed on an outer surface of a projecting portion 3A, 3B, and forms a body portion of a mark. A depth size of the recessed portion 27 is set to a value approximately half of a projection size of the projecting portion 3A, 3B from an outer surface of a side portion 1c. In FIG. 2, recessed portions 27 having shapes corresponding to letters "T", "O" are indicated.

A portion which surrounds the recessed portion 27 is a brim portion 28 of a mark and, for example, a white colored portion 6 is formed on an outer surface of the brim portion 28. The colored portion 6 is printed in an offset manner toward the inside from an outer edge of the outer surface of the brim portion 28. As a method of printing the colored portion 6, besides an ink jet method, pad printing, screen printing, a thermal transfer method and the like are named. As a method of offsetting the colored portion 6, the following various patterns are considered. In these patterns, a width size (brim width) of the brim portion 28 is set to 3 mm or more, and an offset amount is set to a value which falls within a range of 0.5% to 40% of the brim width.

In the patterns shown in FIGS. 25 to 30, the brim width is set uniform over the whole circumference of a mark.

Figure 25:
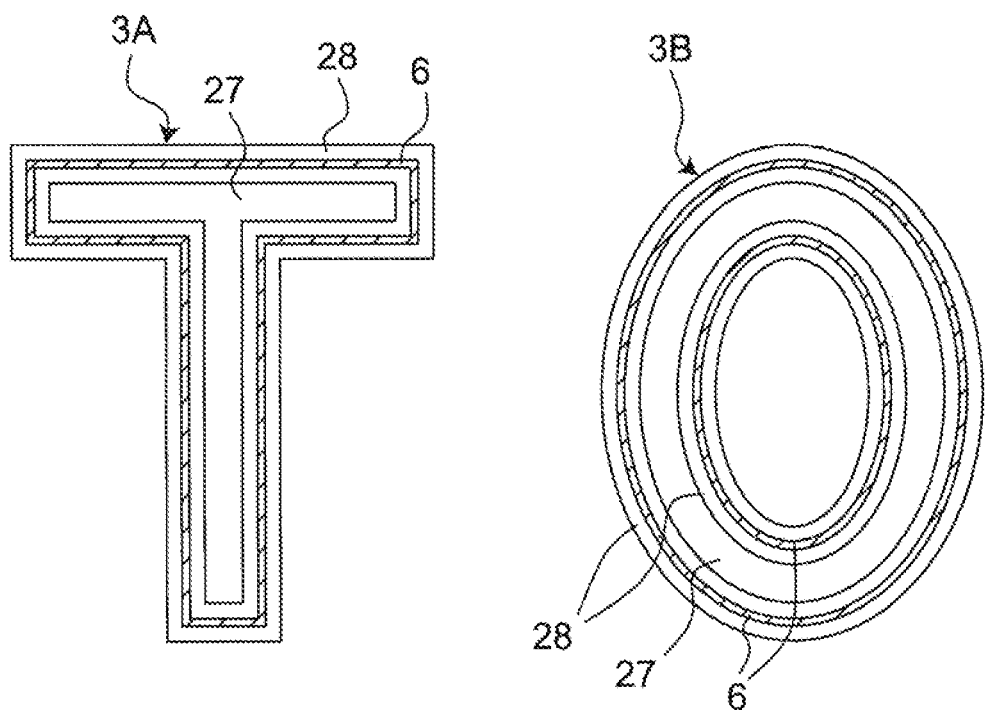
FIG. 25 is a front view showing an example of the projecting portion.

In the pattern shown in FIG. 25, a colored portion 6 is formed at a reference position where an offset amount of the colored portion 6 is set uniform over the whole circumference of the colored portion 6 (reference tire).

Figure 26:
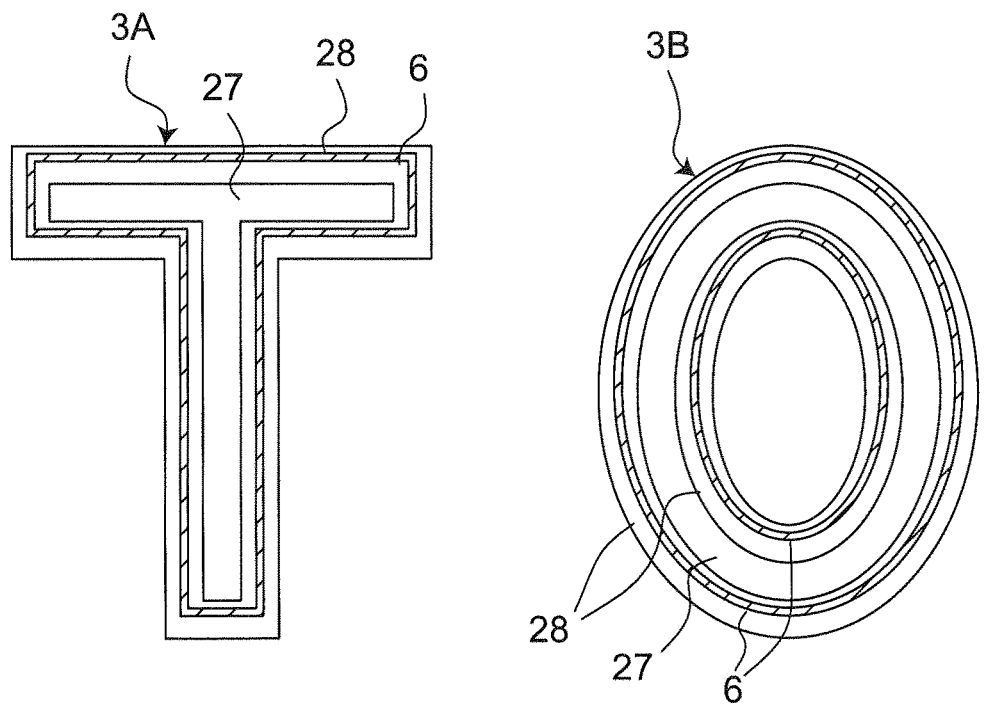
FIG. 26 is a front view showing an example of the projecting portion.

In the pattern shown in FIG. 26, an offset amount of the colored portion 6 is positionally displaced only outwardly in the tire radial direction from the reference position shown in FIG. 4.

Figure 27:
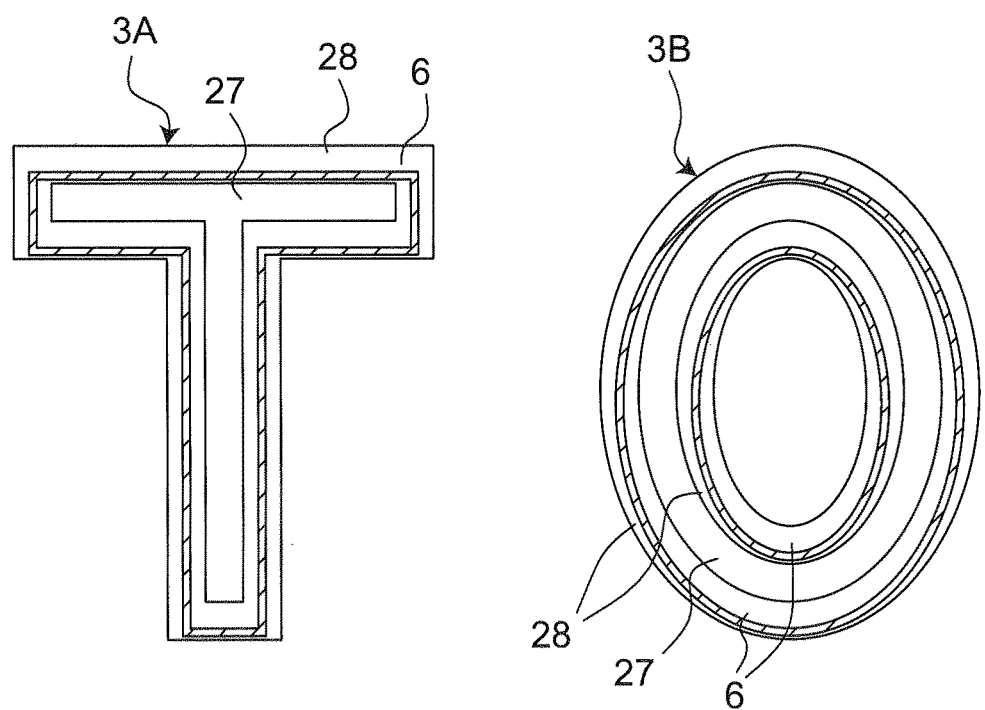
FIG. 27 is a front view showing an example of the projecting portion.

In the pattern shown in FIG. 27, an offset amount of the colored portion 6 is positionally displaced only inwardly in the tire radial direction from the reference position shown in FIG. 4.

Figure 28:
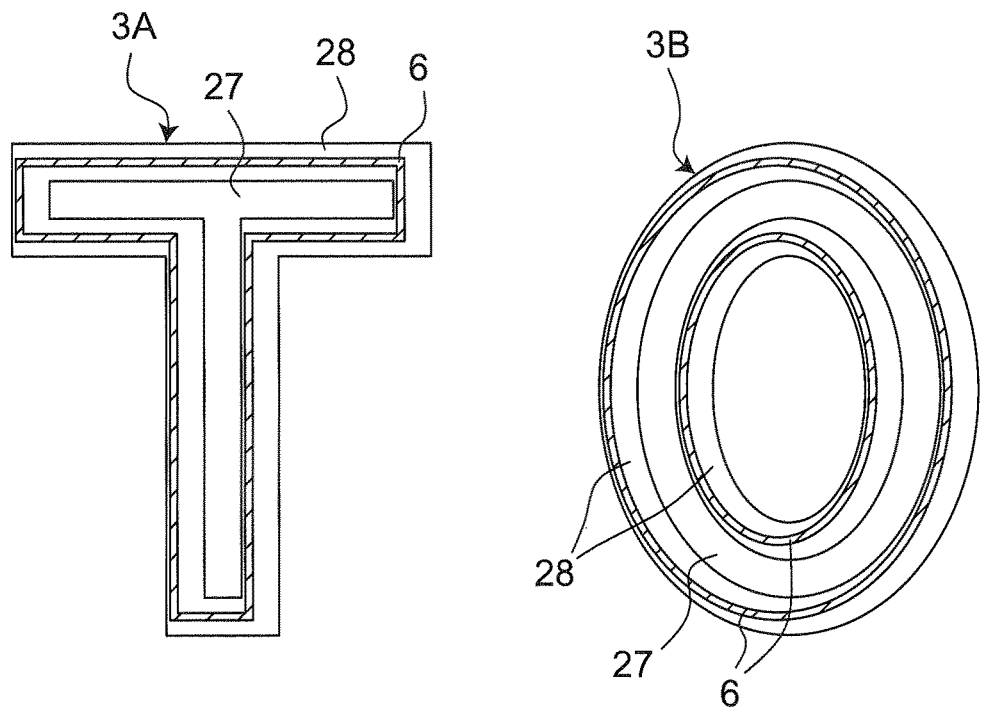
FIG. 28 is a front view showing an example of the projecting portion.

In the pattern shown in FIG. 28, an offset amount of the colored portion 6 is positionally displaced only in the circumferential direction (rotating direction: rotating direction when a vehicle advances) of the tire from the reference position shown in FIG. 4.

Figure 29:
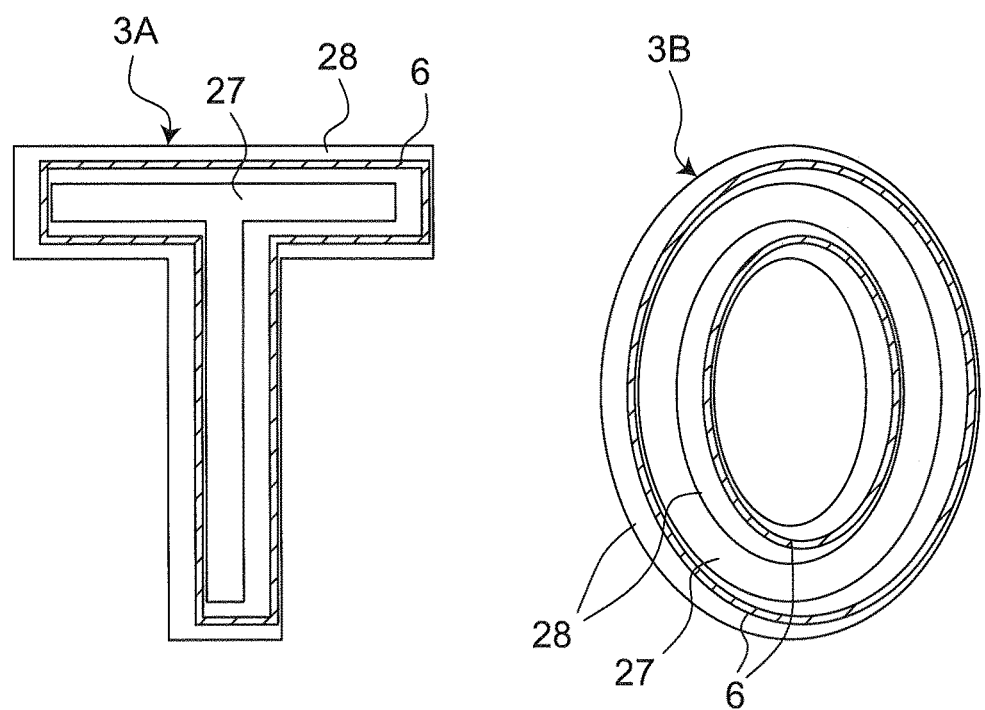
FIG. 29 is a front view showing an example of the projecting portion.

In the pattern shown in FIG. 29, an offset amount of the colored portion 6 is positionally displaced only in the circumferential direction (direction opposite to rotating direction) of the tire from the reference position shown in FIG. 4.

Figure 30:
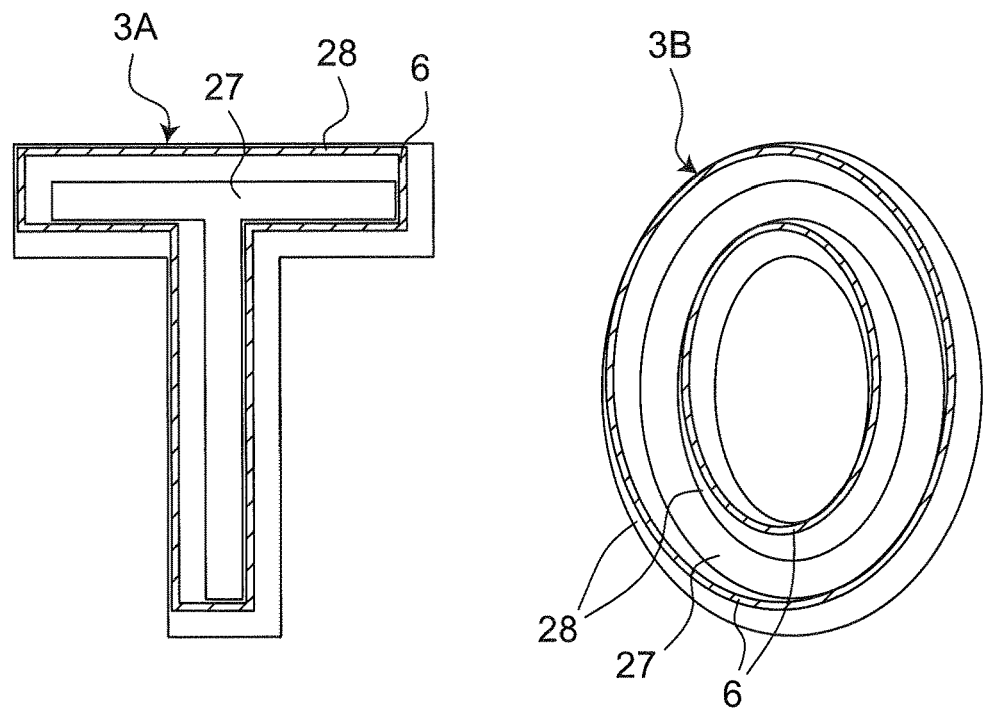
FIG. 30 is a front view showing an example of the projecting portion.

In the pattern shown in FIG. 30, an offset amount of the colored portion 6 is positionally displaced both in the radial direction of the tire and in the circumferential direction of the tire from the reference position shown in FIG. 4.

In the patterns shown in FIGS. 31 to 35, a brim width is changed. An offset amount of the colored portion 6 is substantially equal to an offset amount in the patterns shown in FIGS. 26 to 30.

Figure 31:
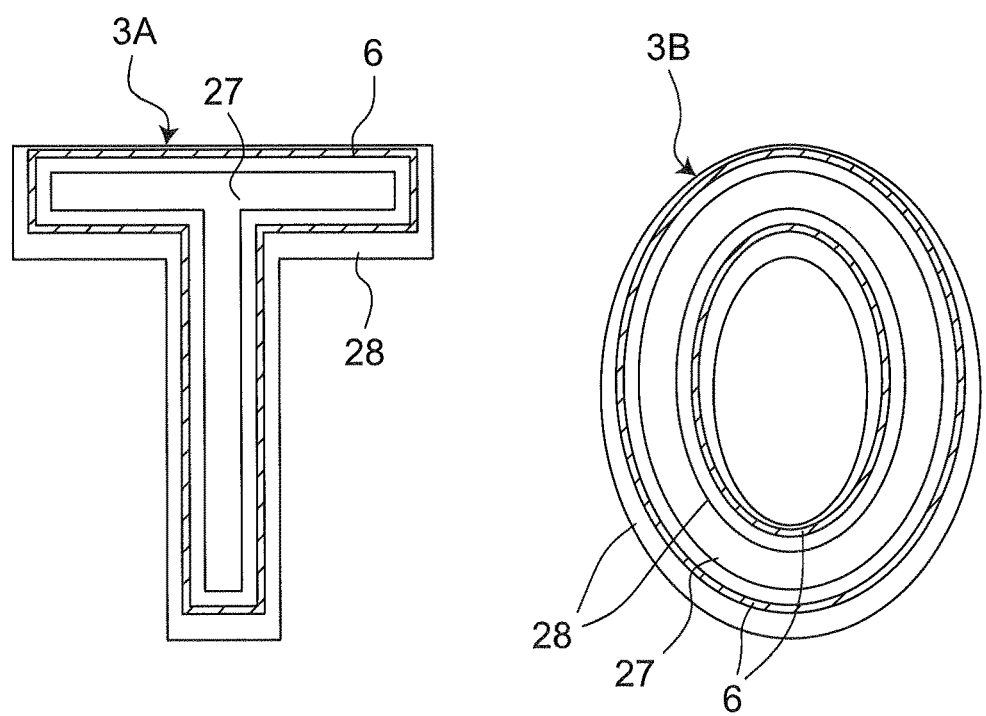
FIG. 31 is a front view showing an example of the projecting portion.

In the pattern shown in FIG. 31, the brim width is further changed. The brim width is changed from the reference width shown in FIG. 4 which is uniform over the whole circumference to a width which is offset only outwardly in the tire radial direction. Accordingly, the brim width is narrowed at an outer side in the tire radial direction, and is widened at an inner side in the tire radial direction.

Figure 32:
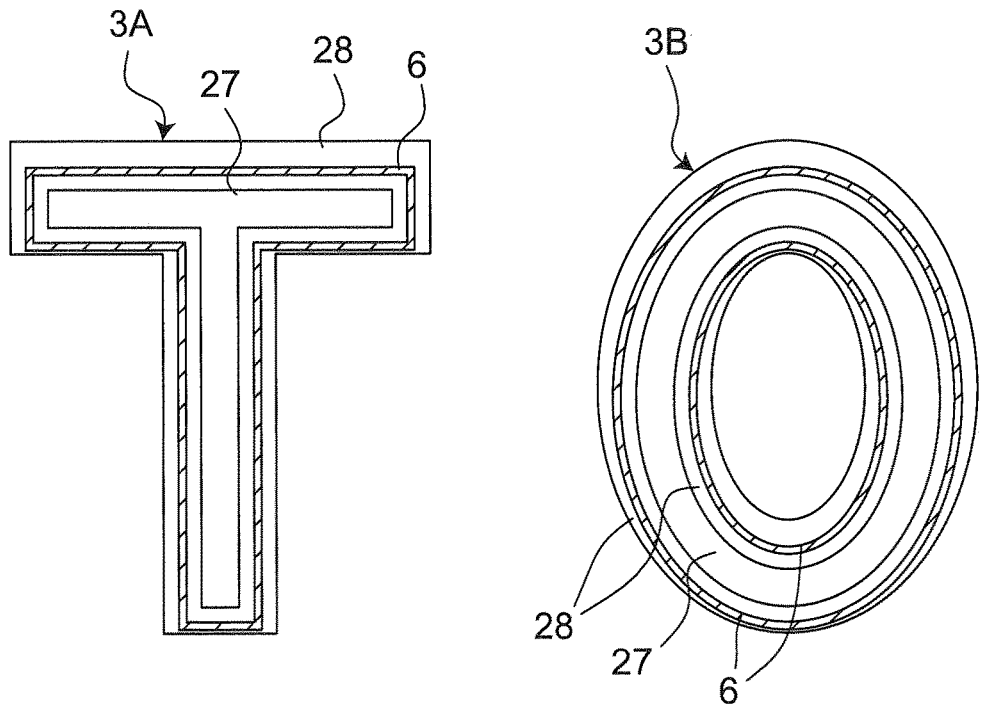
FIG. 32 is a front view showing an example of the projecting portion.

In the pattern shown in FIG. 32, the brim width is offset only inwardly in the tire radial direction from the reference width shown in FIG. 24 which is uniform over the whole circumference.

Figure 33:
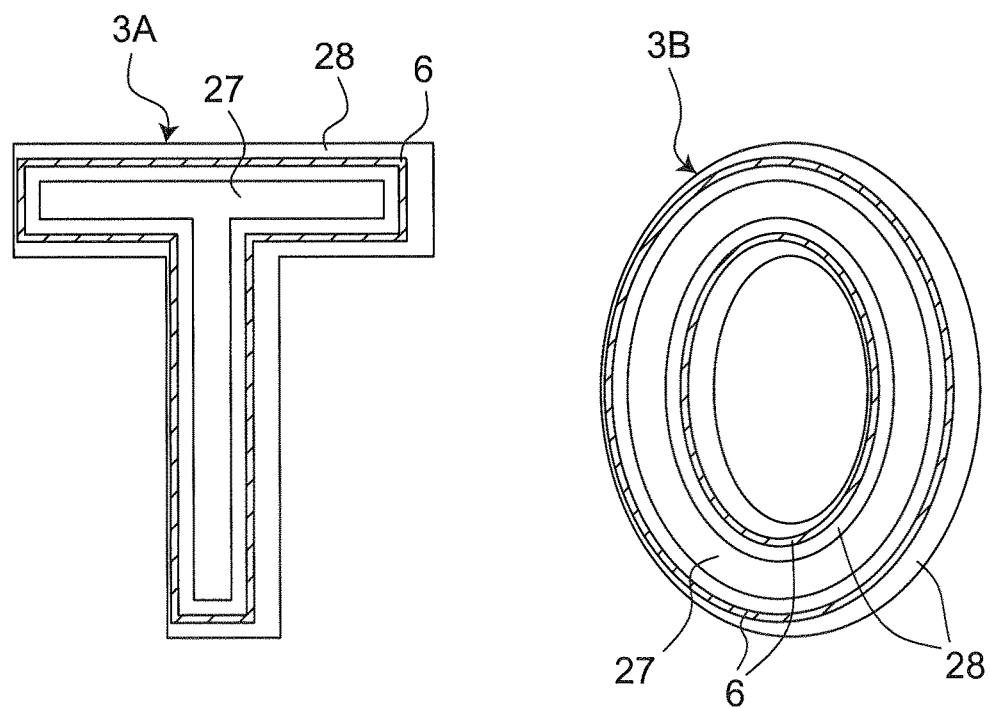
FIG. 33 is a front view showing an example of the projecting portion.

In the pattern shown in FIG. 33, the brim width is offset only in the circumferential direction (rotating direction) of the tire from the reference width shown in FIG. 24 which is uniform over the whole circumference.

Figure 34:
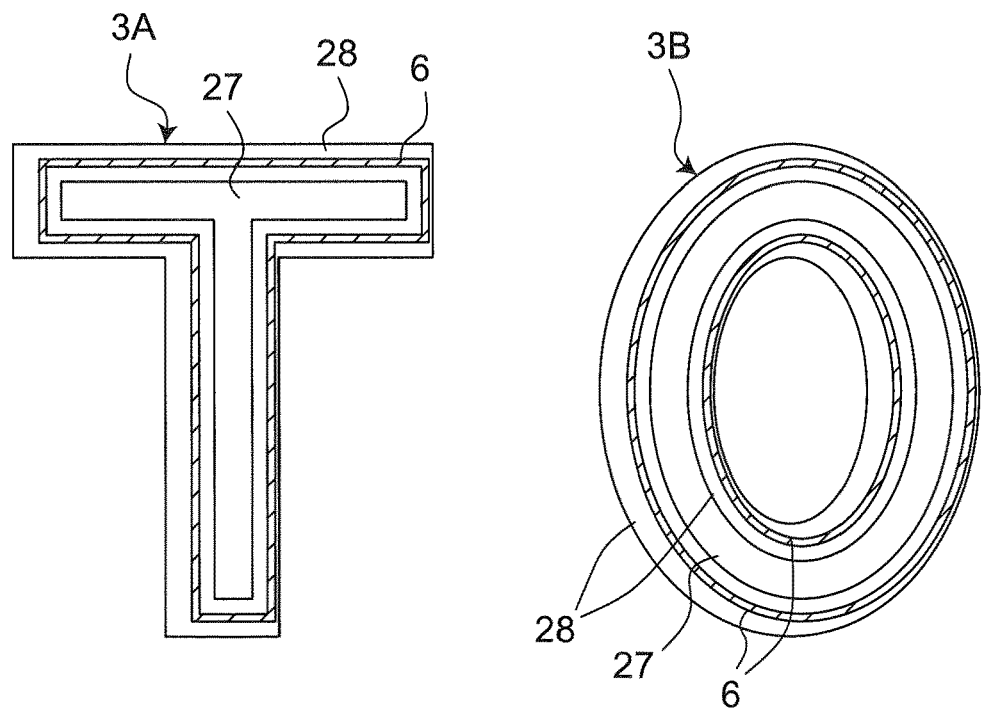
FIG. 34 is a front view showing an example of the projecting portion.

In the pattern shown in FIG. 34, the brim width is offset only in the circumferential direction (direction opposite to the rotating direction) of the tire from the reference width shown in FIG. 24 which is uniform over the whole circumference.

Figure 35:
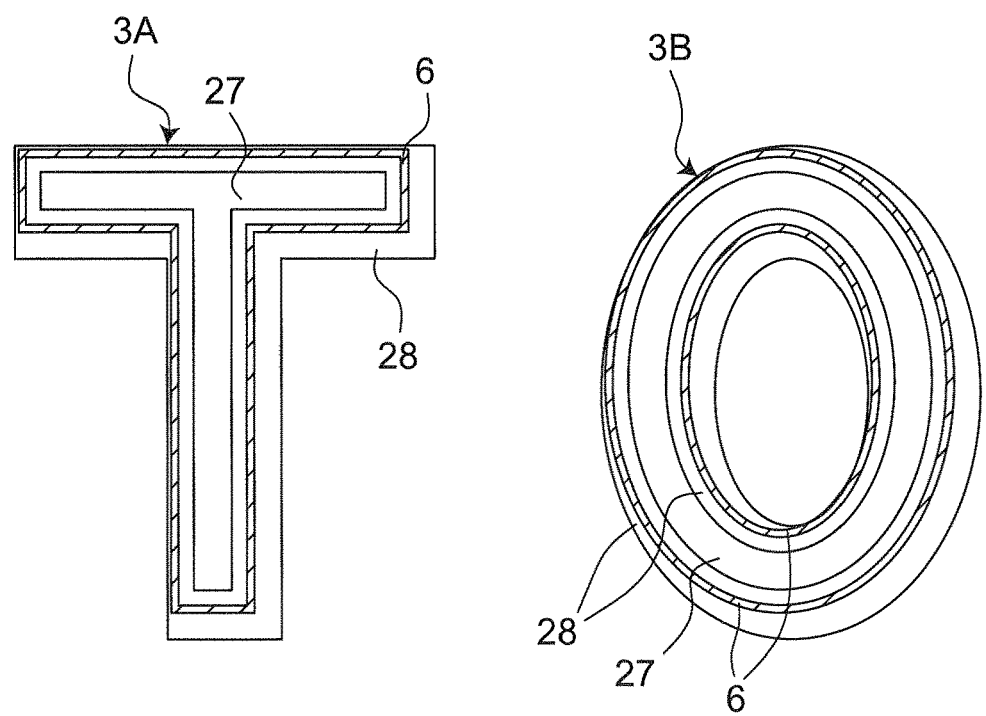
FIG. 35 is a front view showing an example of the projecting portion.

In the pattern shown in FIG. 35, the brim width is offset both in the radial direction and the circumferential direction of the tire from the reference width shown in FIG. 24 which is uniform over the whole circumference.

Although the projecting portions 3A, 3B are formed on the side portion 1c of the tire as described previously, the positions of the projecting portions 3A, 3B fall within a range of 30% to 75% of a tire cross-section height. For example, in case of a tire of 225/50R18, the tire cross-section height is 112.5 mm so that the positions of the projecting portions 3A, 3B may be set to fall within a range of 33.75 mm to 84.375 mm.

(Evaluation Test 3)

The following Table 5 shows a result of evaluation on visibility of the tires on which the marks shown in FIGS. 26 to 35 were respectively formed. In the evaluation method, each tire was mounted on a vehicle, and the visibility (three-dimensional appearance, clear appearance) as viewed from a position away from the tire by 1 m was evaluated with an index of the reference tire shown in FIG. 25 set as 100.

colored portion 6 is offset in the tire radial direction, in the tire circumferential direction or both in the tire radial direction and in the tire circumferential direction. However, each offset amount can take any value provided that the colored portion 6 is formed on the outer surface of the brim portion 28. Due to such a configuration, these tires also can exhibit excellent visibility.

In the above-mentioned embodiments, the marks are arranged at four portions of the side portion 1c positioned equidistantly in the circumferential direction. However, the number of marks can be set freely, and it is also unnecessary to arrange the marks at equal intervals.

In the above-mentioned embodiments, the description has been made with respect to the examples where the brim width is changed only in a state where the colored portion 6 is offset. However, only the brim width can be changed while setting the colored portion 6 at the reference position.

Figure 36:
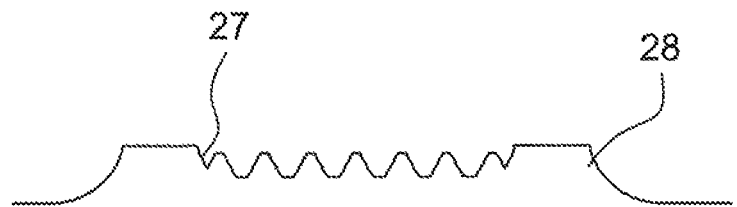
FIG. 36 is a partial sectional view showing a recessed portion.

In the above-mentioned embodiments, a bottom surface of the recessed portion 27 formed on the projecting portion 3A, 3B is formed of a flat surface. However, the bottom surface may be formed into an uneven surface as shown in FIG. 36. The uneven surface may be formed of a plurality of protrusions or a plurality of projections arranged parallel to each other.

Seventh Embodiment

Figure 37:
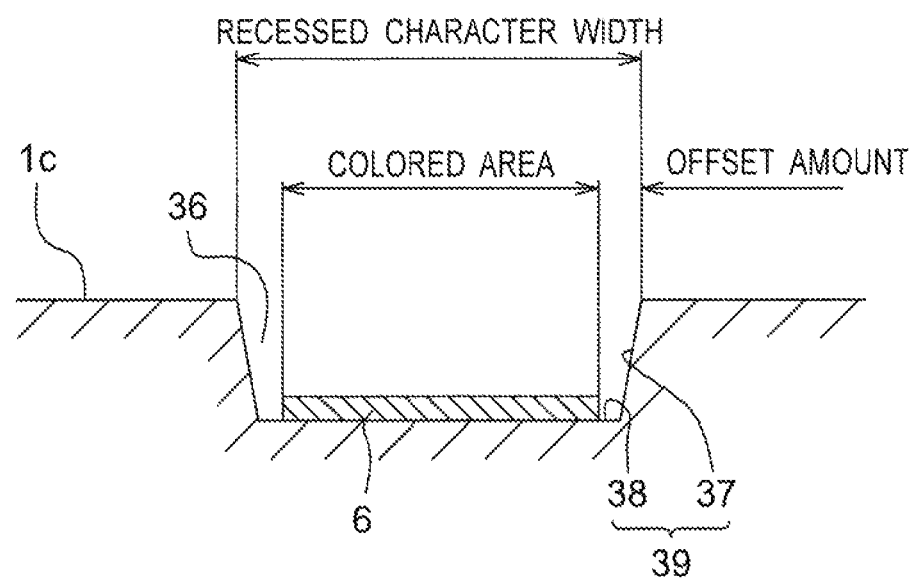
FIG. 37 is sectional view similar to FIG. 5 showing a recessed portion.

As shown in FIG. 37, a recessed portion 36 is formed on a side portion 1c of a tire such that the recessed portion 36 is indented from an outer surface of the side portion 1c and forms a mark. In this case, the recessed portion 36 is formed at four portions of the side portion 1c positioned equidistantly in the circumferential direction of the tire. It is preferable that the recessed portion 36 have a length in the tire radial direction which is 15% to 45% of a tire cross-section height. In FIG. 2, the recessed portions 36 having shapes corresponding to letters "T" and "O" in alphabet are shown.

As shown in FIG. 37, the recessed portion 36 is formed of: inclined surfaces 37 which are gradually inclined toward an inner side from an opening edge; and a flat surface 38 disposed inside the inclined surfaces 37. A display bottom surface 39 is formed of the inclined surfaces 37 and the flat surface 38. A colored portion 6 is formed on the display bottom surface 39 in an offset manner from the opening edge of the recessed portion 36. In this case, the colored portion 6 is printed such that an offset amount from the opening edge becomes 0.5% to 40% of a width size of the opening edge of the recessed portion 36 (width of recessed letter). As a

TABLE 5

| Drawing number | FIG. 25 | FIG. 26 | FIG. 27 | FIG. 28 | FIG. 29 | FIG. 30 |
|---|---|---|---|---|---|---|
| Visibility | 100 | 104 | 104 | 103 | 103 | 105 |
| FIG. 31 | FIG. 32 | FIG. 33 | FIG. 34 | FIG. 35 | | |
| 105 | 105 | 104 | 104 | 106 | | |

As can be explicitly understood from Table 5, whichever direction of the tire radial direction and the tire circumferential direction the colored portion is offset, the improvement of visibility was recognized. Particularly, offsetting the colored region both in the tire radial direction and in the tire circumferential direction mostly improved visibility.

For example, in the above-mentioned embodiments, the description has been made with respect to the case where the method of printing the colored portion 6, besides an ink jet method, pad printing, screen printing, a thermal transfer method and the like are named. As a method of offsetting the colored portion 6, the following various patterns are considered.

Figure 38:
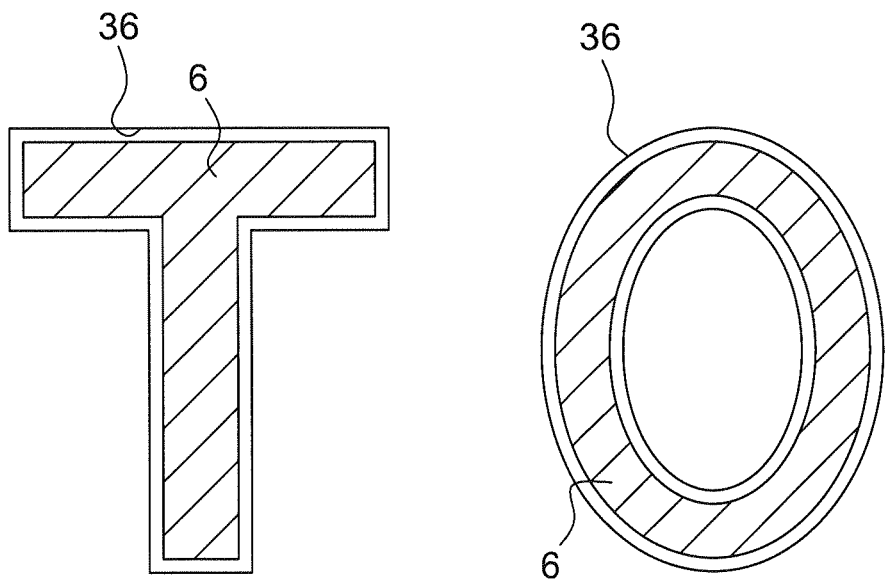
FIG. 38 is a front view showing an example of the recessed portion.

In the pattern shown in FIG. 38, a colored portion 6 is formed at a reference position where an offset amount of the colored portion 6 from an outer edge of the recessed portion 36 is set uniform over the whole circumference of the colored portion 6 (reference tire).

Figure 39:
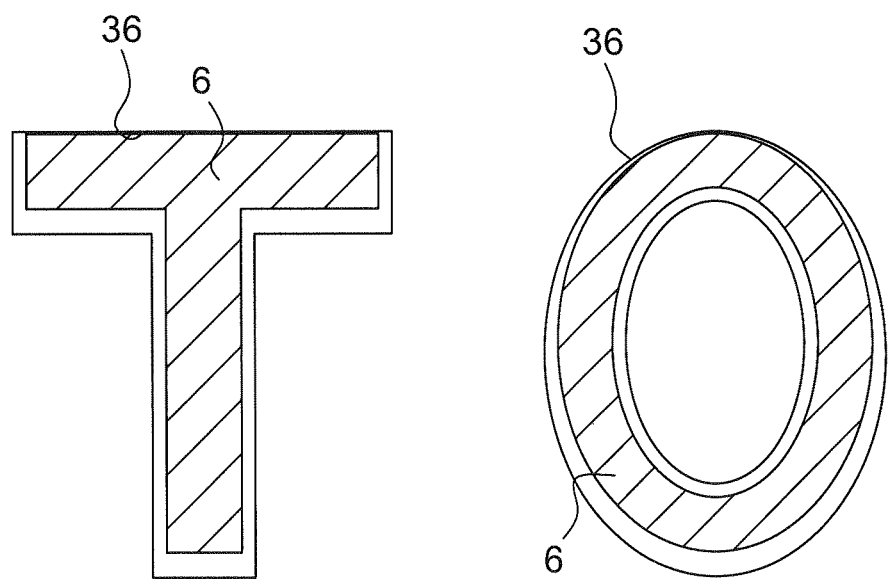
FIG. 39 is a front view showing an example of the recessed portion.

In the pattern shown in FIG. 39, the colored portion 6 is positionally displaced only outwardly in the tire radial direction from the reference position shown in FIG. 38.

Figure 40:
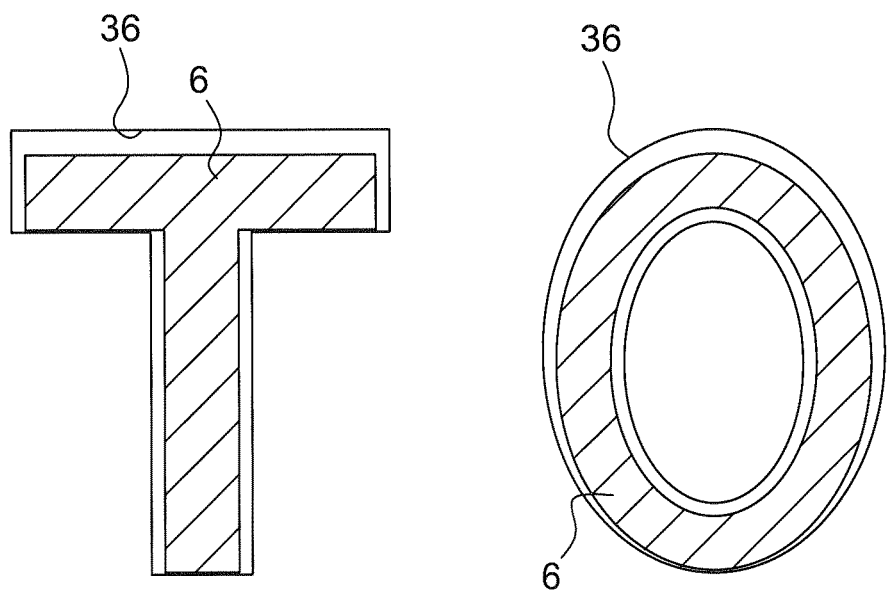
FIG. 40 is a front view showing an example of the recessed portion.

In the pattern shown in FIG. 40, the colored portion 6 is positionally displaced only inwardly in the tire radial direction from the reference position shown in FIG. 38.

Figure 41:
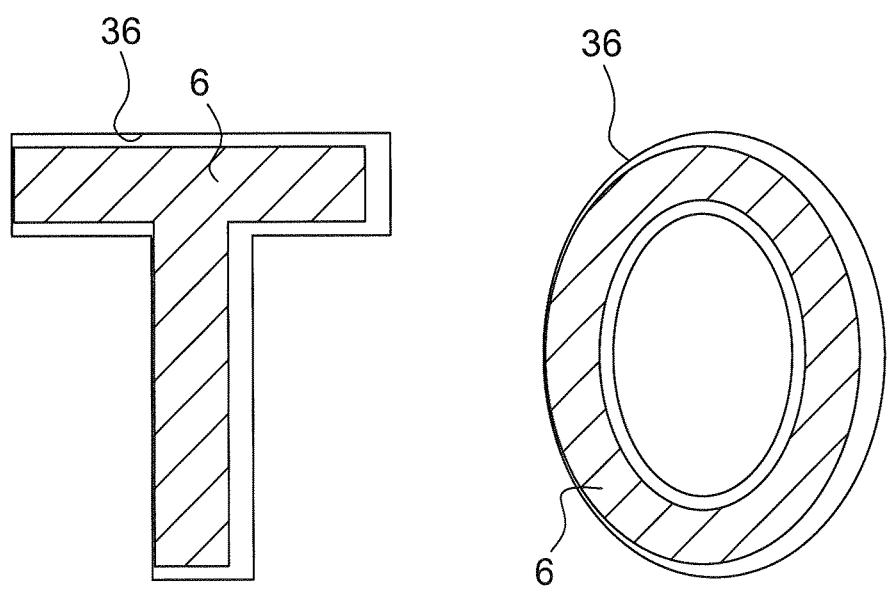
FIG. 41 is a front view showing an example of the recessed portion.

In the pattern shown in FIG. 41, the colored portion 6 is displaced only in the circumferential direction (rotating direction: rotating direction when a vehicle advances) of the tire from the reference position shown in FIG. 38.

Figure 42:
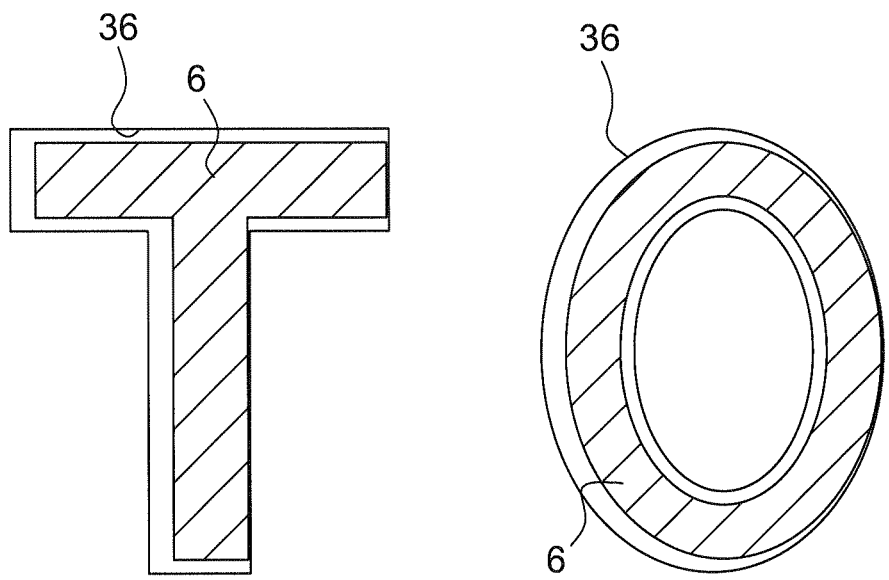
FIG. 42 is a front view showing an example of the recessed portion.

In the pattern shown in FIG. 42, the colored portion 6 is displaced only in the circumferential direction (direction opposite to rotating direction) of the tire from the reference position shown in FIG. 38.

Figure 43:
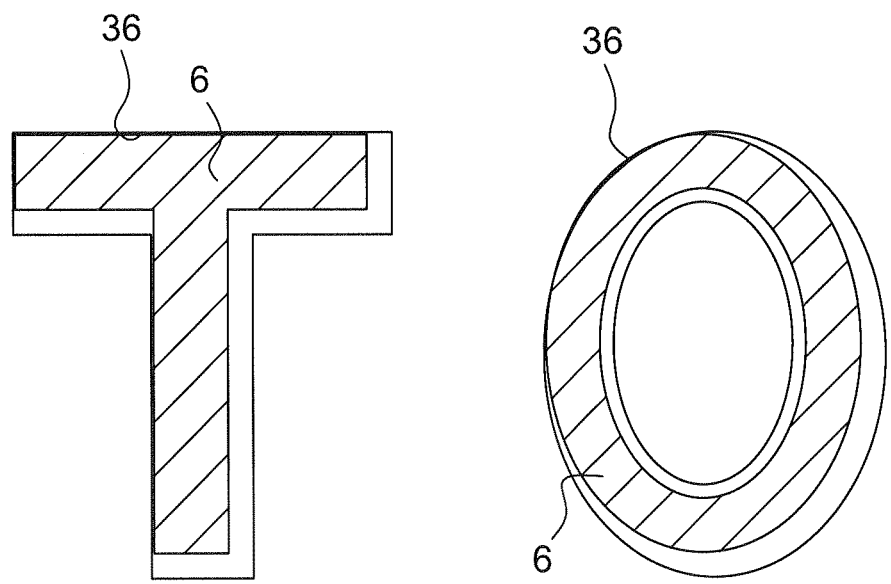
FIG. 43 is a front view showing an example of the recessed portion.

In the pattern shown in FIG. 43, the colored portion 6 is displaced both in the radial direction of the tire and in the circumferential direction of the tire from the reference position shown in FIG. 38.

Although the recessed portion 36 is formed on the side portion 1c of the tire as described previously, the position of the recessed portion 36 falls within a range of 30% to 75% of a tire cross-section height. For example, in case of a tire of 225/50R18, the tire cross-section height is 112.5 mm so that the position of the projecting portion 6 is set to fall within a range of 33.75 mm to 84.375 mm.

(Evaluation Test 4)

The following Table 6 shows a result of evaluation on visibility of the tires on which the marks shown in FIGS. 38 to 43 were respectively formed. In the evaluation method, each tire was mounted on a vehicle, and the visibility (three-dimensional appearance, clear appearance) as viewed from a position away from the tire by 1 m was evaluated with an index of the reference tire shown in FIG. 38 set as 100.

TABLE 6

| Drawing number | FIG. 38 | FIG. 39 | FIG. 40 | FIG. 41 | FIG. 42 | FIG. 43 |
|---|---|---|---|---|---|---|
| Visibility | 100 | 104 | 104 | 103 | 103 | 105 |

As can be explicitly understood from Table 6, whichever direction of the tire radial direction and the tire circumferential direction the colored portion 6 is offset, the improvement of visibility was recognized. Particularly, visibility was improved most by offsetting the colored portion both in the tire radial direction and in the tire circumferential direction.

Eighth Embodiment

Figure 44:
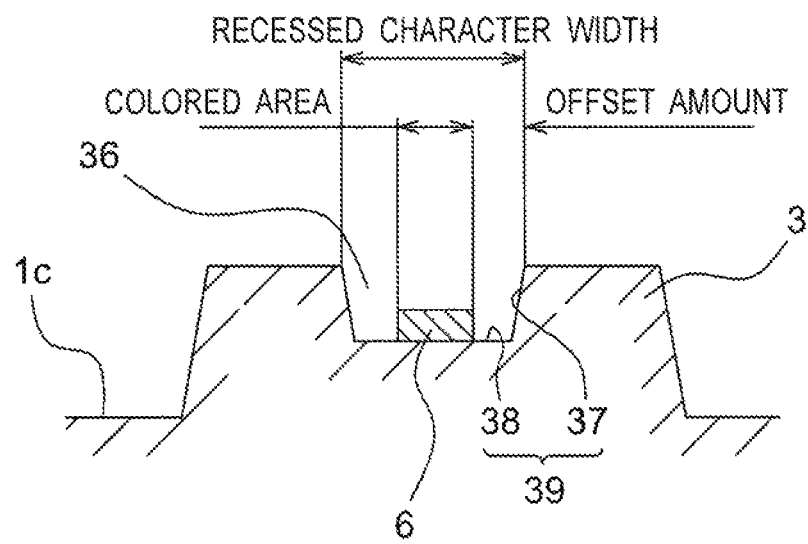
FIG. 44 is a front view showing other example of the recessed portion.

As shown in FIG. 44, a projecting portion 3 which forms a mark is formed on an outer surface of a side portion 1c. A recessed portion 36 is formed on an outer surface of the projecting portion 3. The constitutions of the recessed portion 36 and the colored portion 6 formed on the recessed portion 36 are substantially equal to the corresponding constitutions of the recessed portion 36 and the colored portion 6 of the seventh embodiment and hence, the explanation of constitutional parts corresponding to the constitutional parts of the embodiment 7 is omitted while adding the same numerals to these constitutional parts.

Also with respect to a method of offsetting the colored portion 6, in the same manner as the seventh embodiment, five patterns shown in FIGS. 45 to 50 are considered. However, in FIGS. 45 to 50, for the sake of convenience of description, a boundary line between an upper end surface of the projecting portion 3 and a peripheral inclined surface and a boundary line between the upper end surface of the projecting portion 3 and an inclined surface 37 of the recessed portion 36 are omitted.

Figure 45:
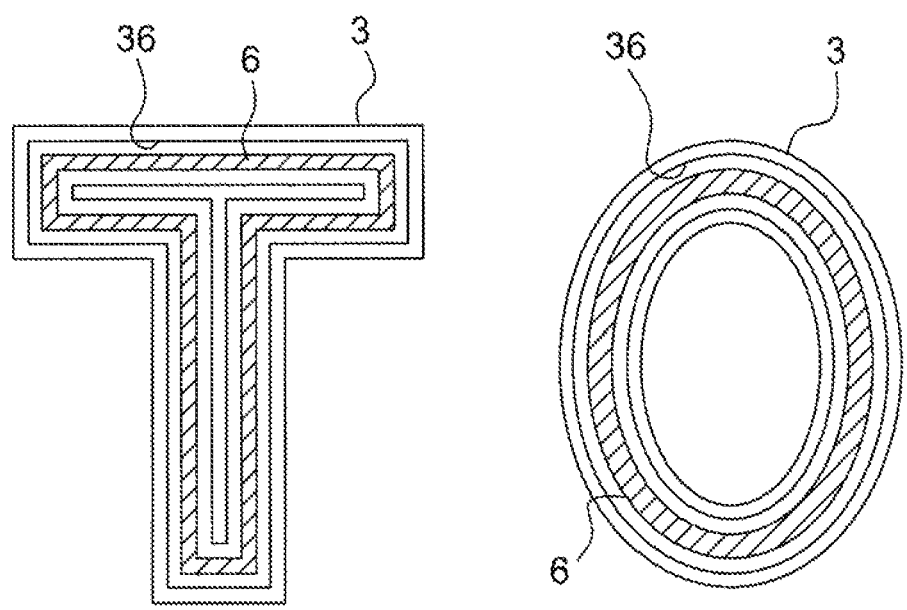
FIG. 45 is a front view showing other example of the recessed portion.

In the pattern shown in FIG. 45, a colored portion 6 is formed at a reference position where an offset amount of the colored portion 6 from an outer edge of the recessed portion 36 is set uniform over the whole circumference of the colored portion 6 (reference tire).

Figure 46:
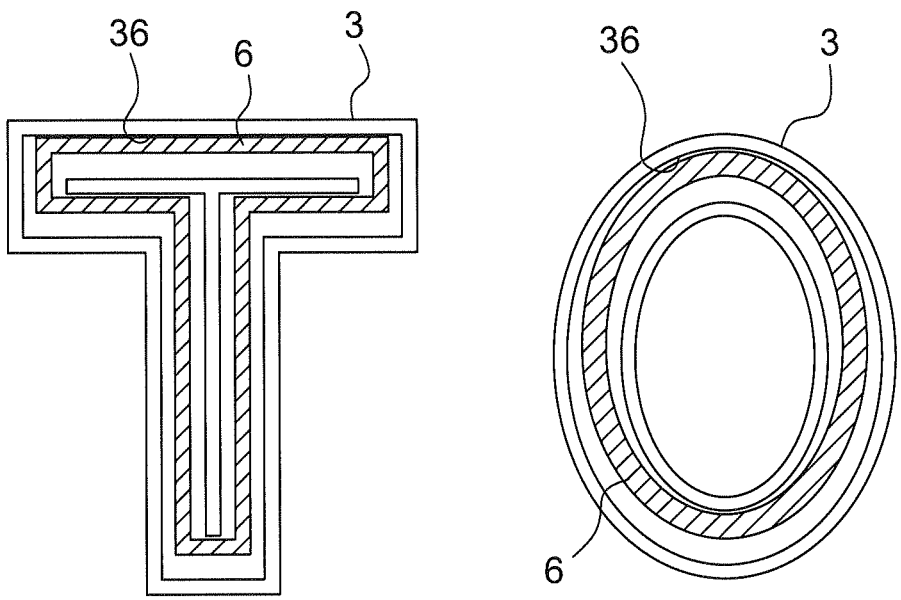
FIG. 46 is a front view showing other example of the recessed portion.

In the pattern shown in FIG. 46, the colored portion 6 is positionally displaced only outwardly in the tire radial direction from the reference position shown in FIG. 45.

Figure 47:
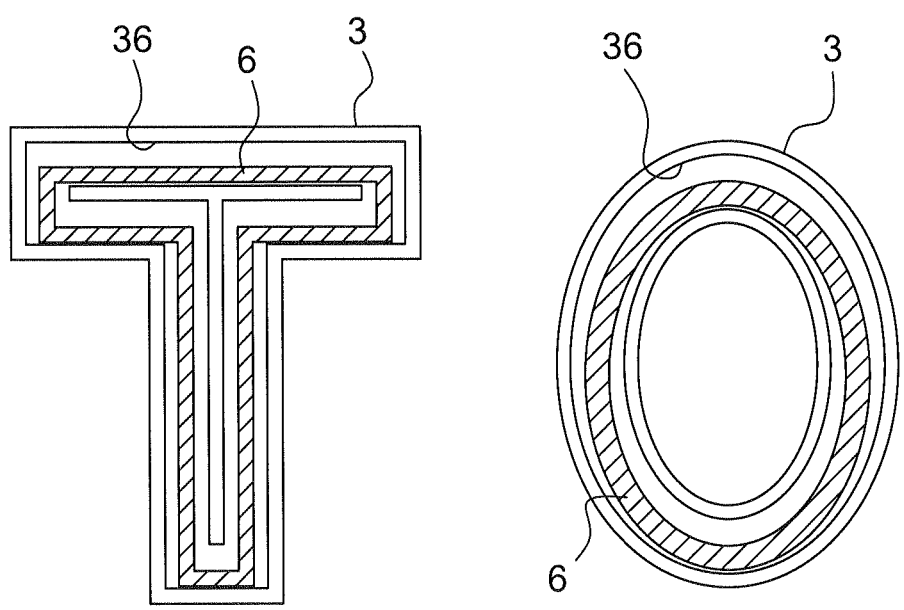
FIG. 47 is a front view showing other example of the recessed portion.

In the pattern shown in FIG. 47, the colored portion 6 is positionally displaced only inwardly in the tire radial direction from the reference position shown in FIG. 45.

Figure 48:
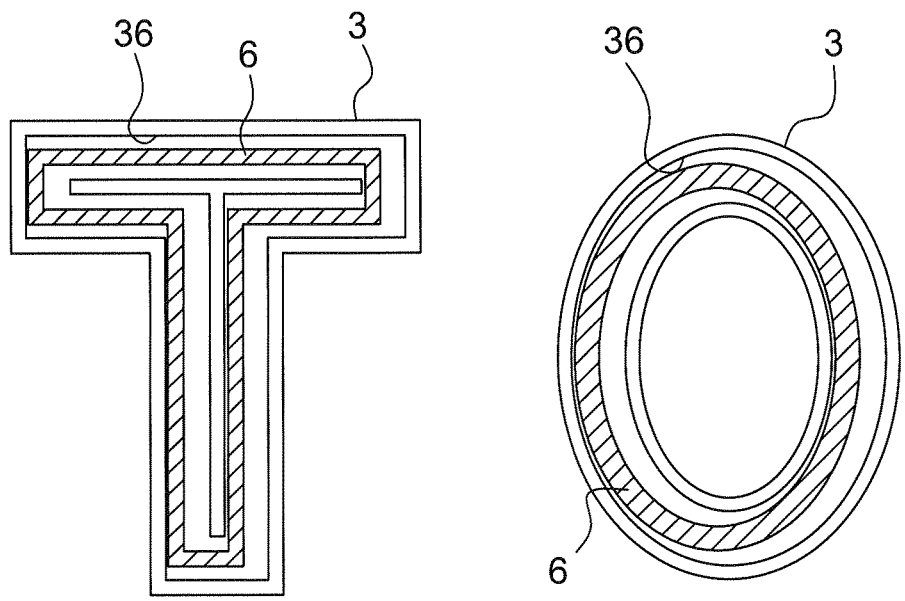
FIG. 48 is a front view showing other example of the recessed portion.

In the pattern shown in FIG. 48, the colored portion 6 is positionally displaced only in the circumferential direction (rotating direction: rotating direction when a vehicle advances) of the tire from the reference position shown in FIG. 45.

Figure 49:
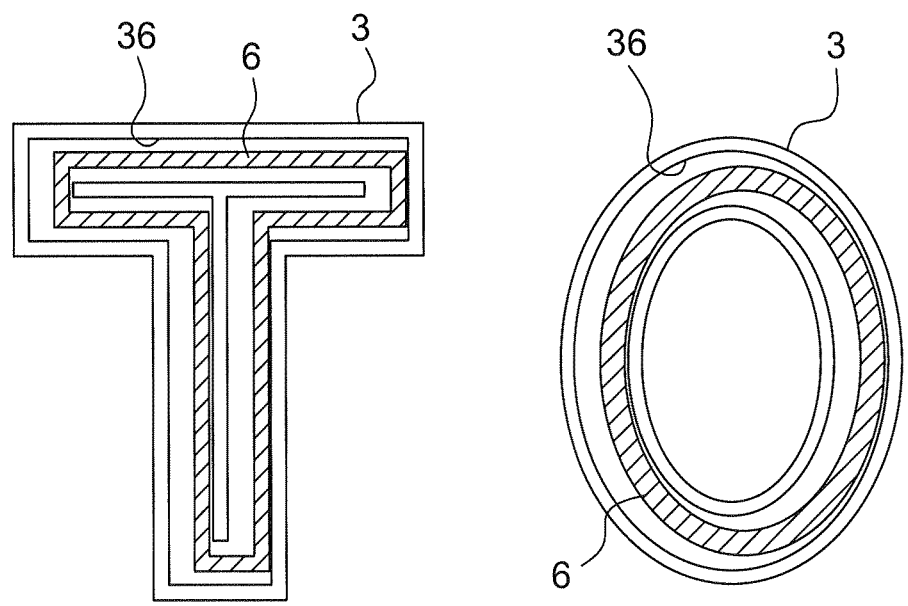
FIG. 49 is a front view showing other example of the recessed portion.

In the pattern shown in FIG. 49, the colored portion 6 is positionally displaced only in the circumferential direction (direction opposite to rotating direction) of the tire from the reference position shown in FIG. 45.

Figure 50:
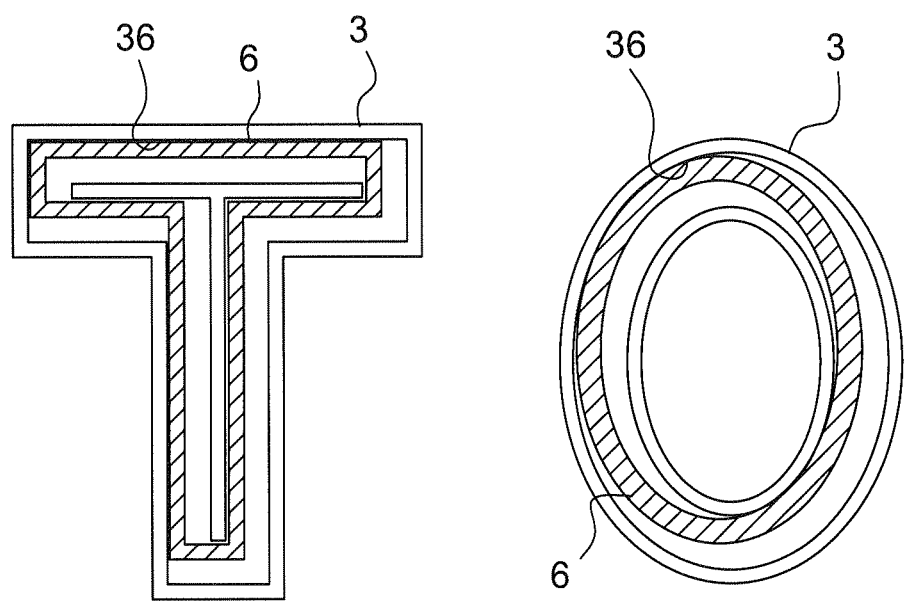
FIG. 50 is a front view showing other example of the recessed portion.

In the pattern shown in FIG. 50, the colored portion 6 is positionally displaced both in the radial direction of the tire and in the circumferential direction of the tire from the reference position shown in FIG. 45.

(Evaluation Test 5)

The following Table 7 shows a result of evaluation on visibility of the tires on which the marks shown in FIGS. 45 to 50 were respectively formed. The evaluation method is substantially equal to the evaluation method of the seventh embodiment.

TABLE 7

| Drawing number | FIG. 45 | FIG. 46 | FIG. 47 | FIG. 48 | FIG. 49 | FIG. 50 |
|---|---|---|---|---|---|---|
| Visibility | 100 | 104 | 104 | 103 | 103 | 105 |

As can be explicitly understood from Table 7, whichever direction of the tire radial direction and the tire circumferential direction the colored portion 6 is offset, the improvement of visibility was recognized. Particularly, visibility was improved most by offsetting the colored portion 6 both in the tire radial direction and in the tire circumferential direction.

In the above-mentioned embodiment, the colored portion 6 is formed on the flat surface 38 which forms the display bottom surface 39 of the recessed portion 36. However, the colored portion 6 may be formed on the inclined surface 37. However, it is preferable to form the colored portion 6 on the flat surface 38 from a position further offset inwardly from a boundary line between the flat surface 38 and the inclined surface 37. It is because an edge portion (boundary line) does not exist in the colored portion 6 in this case and hence, it is possible to prevent the colored portion from being easily peeled off later whereby visibility of the mark can be maintained favorably for a long period.

In the above-mentioned embodiments, the description has been made with respect to the case where the colored portion 6 is offset in the tire radial direction, in the tire circumferential direction or both in the tire radial direction and in the tire circumferential direction. However, each offset amount can take any value provided that the colored portion 6 is formed on the display bottom surface 39 of the recessed portion 36. Due to such a configuration, these tires also can exhibit excellent visibility in the same manner as described above.

In the above-mentioned embodiments, the marks are arranged at four portions of the side portion 1c positioned equidistantly in the circumferential direction. However, the number of marks can be set freely, and it is also unnecessary to arrange the marks at equal intervals.

Figure 51:
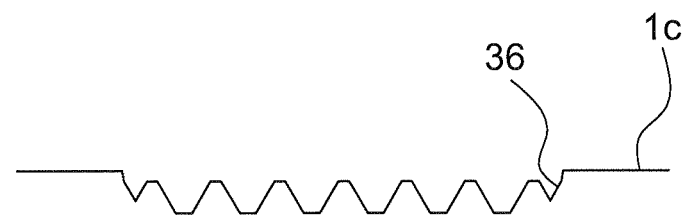
FIG. 51 is a partial sectional view showing other example of the recessed portion.
Figure 52:
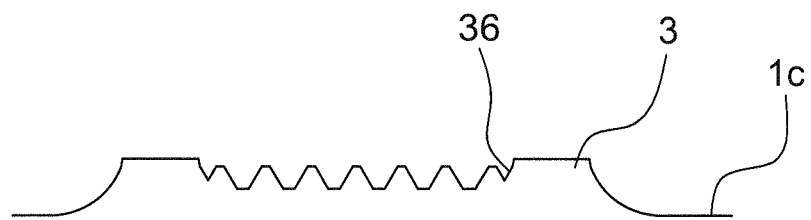
FIG. 52 is a partial sectional view showing other example of the recessed portion.

In the above-mentioned embodiments, the flat surface 38 having no unevenness is formed on the recessed portion 36. However, in the case where the recessed portion 36 is directly formed on the side portion 1c as shown in FIG. 51 or in the case where recessed portion 36 is formed on the projecting portion 3 formed on the side portion 1c as shown in FIG. 52, an unevenness may be formed on the flat surface 38. The unevenness may be formed of a plurality of protrusions or a plurality of projections arranged parallel to each other.

Ninth Embodiment

Figure 53:
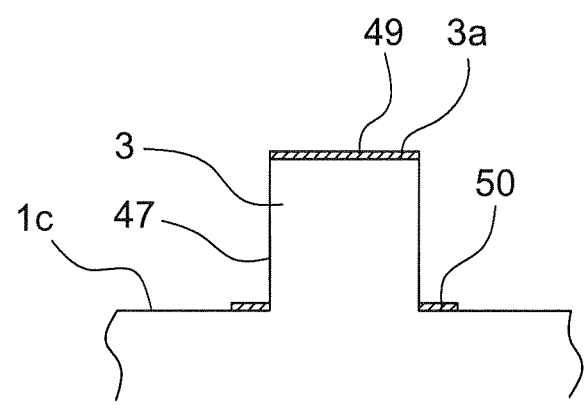
FIG. 53 is a sectional view of the projecting portion of FIG. 1 taken along a line A-A.
Figure 54:
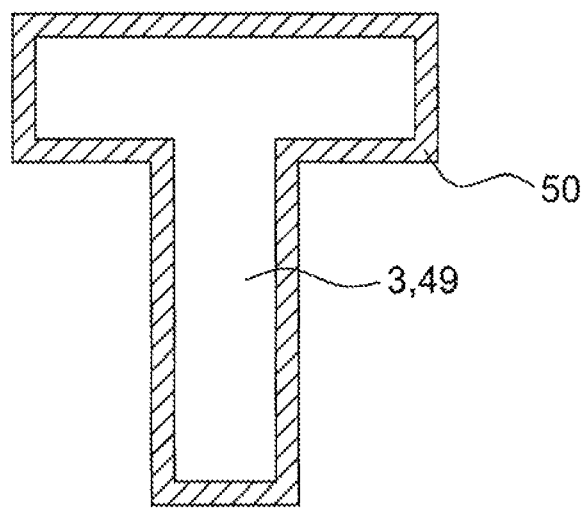
FIG. 54 is a front view showing an example of the projecting portion.

As shown in FIG. 53, a projecting portion 3 includes side surfaces 47 which extend perpendicularly from a surface of a side portion 1c of a tire and a top surface 3a which has the positional relationship of being parallel to a surface of the side portion 1c. A first colored portion 49 is formed by applying a color to the top surface 3a of the projecting portion 3. A second colored portion 50 is formed by applying a color to the surface of the side portion 1c in a region around the projecting portion 3 with a uniform width. The colored regions 9, 10 have colors different from original hue of the tire. As shown in FIG. 54, the second colored portion 50 is positionally displaced with respect to the first colored portion 49 in the tire circumferential direction by a length corresponding to 0.5% to 40% of a maximum width size of a mark portion (a length of an upper lateral line in case of capital "T"). That is, a range of the second colored portion 50 is expanded. Further, the second colored portion 50 is positionally displaced with respect to the first colored portion 49 in the tire radial direction by a length corresponding to 0.5% to 40% of a maximum height size of the mark portion in the radial direction (a length in the vertical direction in case of capital "T") (example 1 in evaluation test 6 described later).

In this manner, the colored region is formed not only on the top surface 3a of the projecting portion 3 but also on the peripheral region of the projecting portion 3 and hence, visibility of the projecting portion 3 is enhanced whereby the mark is brought into a more stereoscopically viewable state.

As a method of printing the colored regions 9, 10, besides an ink jet method, pad printing, screen printing, a thermal transfer method and the like are named. As the offset direction of the second colored portion 50, the following various patterns are considered.

Figure 55:
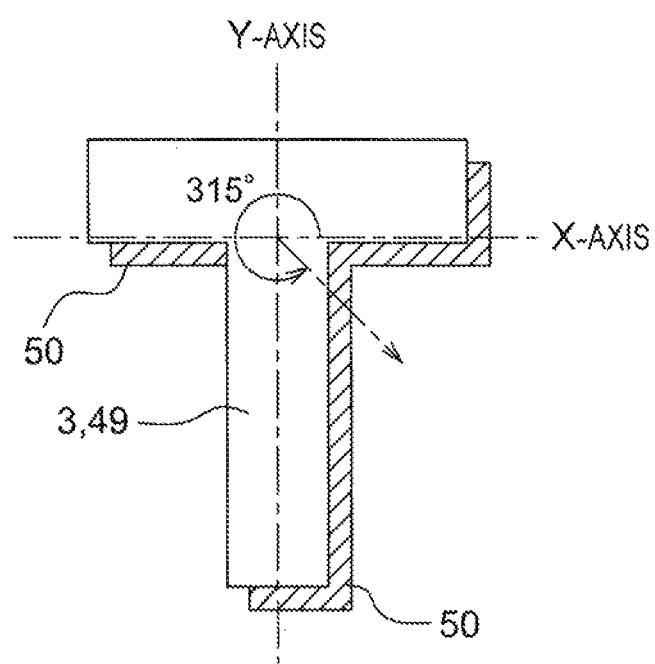
FIG. 55 is a front view showing an example of the projecting portion.

In FIG. 55, a region which is offset obliquely rightward and downward from the first colored portion 49 is formed as the second colored portion 50. More specifically, in a XY coordinates where the position of centroid of the top surface 3a of the projecting portion 3 is set at an origin, the position of the whole first colored portion 49 is displaced in the direction where an angle of the counterclockwise rotating direction is 315° when the plus direction along the X direction is set as 0°, and a portion which projects from the first colored portion 49 and does not fall within the first colored portion 49 is set as the second colored portion 50 (example 2 in evaluation test 6 described later). In this case, an offset amount of the second colored portion 50 is, in the same manner as described with reference to FIG. 53, a length corresponding to 0.5% to 40% of a maximum width size of a mark portion (a length of an upper lateral line in case of capital "T") in the tire circumferential direction of the tire with respect to the first colored portion 49, and a length corresponding to 0.5% to 40% of a maximum height size of a mark portion (a length in the vertical direction in case of capital "T") in the radial direction with respect to the first colored portion 49.

Figure 56:
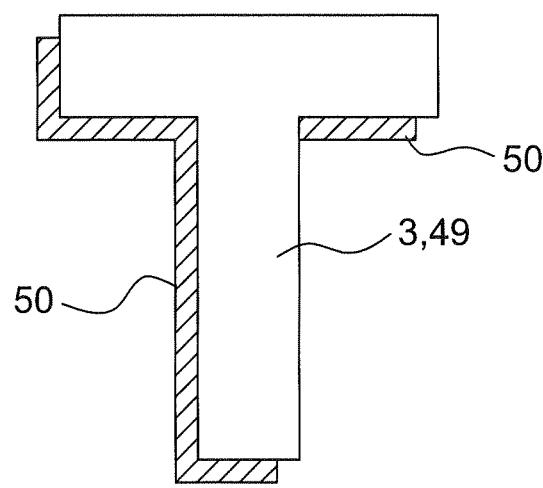
FIG. 56 is a front view showing an example of the projecting portion.

In FIG. 56, a region which is offset obliquely leftward and downward from the first colored portion 49 is formed as the second colored portion 50. In XY coordinates, 225° is the direction that the first colored portion 49 is positionally displaced (example 3 in evaluation test 6 described later).

Figure 57:
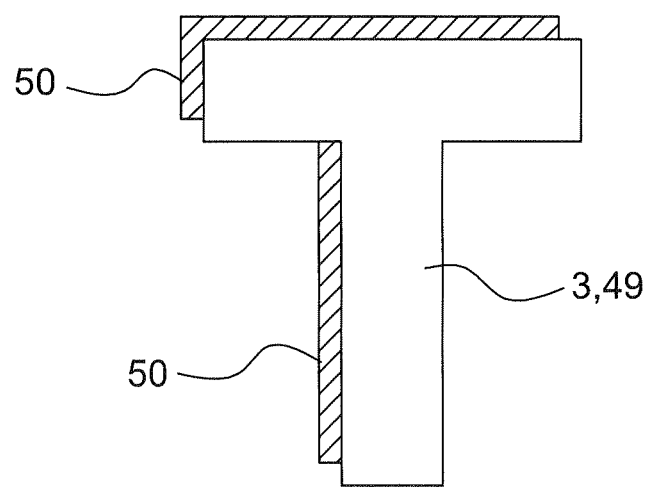
FIG. 57 is a front view showing an example of the projecting portion.

In FIG. 57, a region which is offset obliquely leftward and upward from the first colored portion 49 is formed as the second colored portion 50. In XY coordinates, 135° is the direction that the first colored portion 49 is positionally displaced (example 4 in evaluation test 6 described later).

Figure 58:
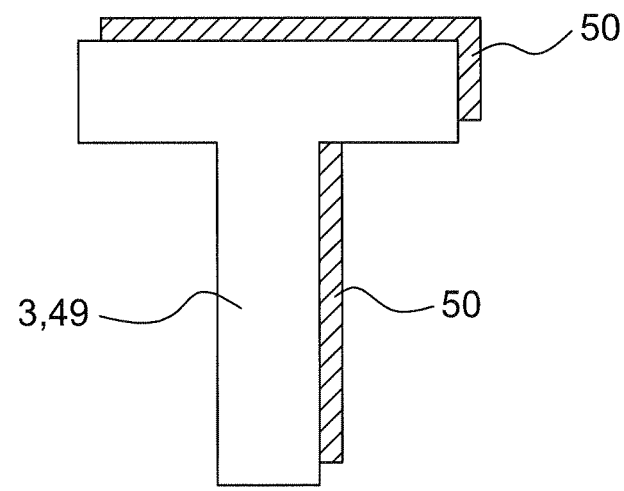
FIG. 58 is a front view showing an example of the projecting portion.

In FIG. 58, a region which is offset obliquely rightward and upward from the first colored portion 49 is formed as the second colored portion 50. In XY coordinates, 45° is the direction that the first colored portion 49 is positionally displaced (example 5 in evaluation test 6 described later).

In all cases shown in FIGS. 56 to 58, an offset amount is substantially equal to an offset amount in the example shown in FIG. 55.

Figure 59:
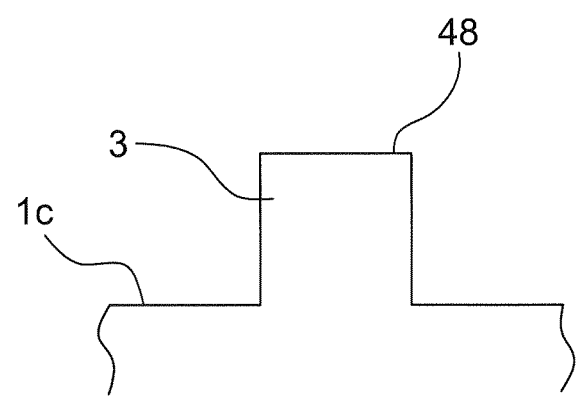
FIG. 59 is a front view of a projecting portion according to a comparative example.

In FIG. 59, only a projecting portion 3 is formed as a mark, and a colored region is not formed (reference tire: comparative example 1).

(Evaluation Test 6)

The following Table 8 shows a result of evaluation on visibility of the tires on which the marks shown in FIGS. 54 to 59 were respectively formed. In the evaluation method, each tire was mounted on a vehicle, and an average value of brightness difference and the visibility (three-dimensional appearance, clear appearance) as viewed from a position away from the tire by 1 m were evaluated with an index of the reference tire shown in FIG. 59 set as 100.

TABLE 8

|  | Comparative Example 1 | Example 1 | Example 2 | Example 3 | Example 4 | Example 5 |
|---|---|---|---|---|---|---|
| Average value of brightness difference | 100 | 102 | 105 | 101 | 103 | 102 |
| Visibility | 100 | 104 | 110 | 102 | 106 | 104 |

As can be explicitly understood from Table 8, in all examples where the second colored portion 50 is formed, an average value of brightness difference and visibility were enhanced. Particularly, as in the case of the example 1, the most favorable index was acquired by offsetting the second colored portion 50 to an oblique rightward and downward position.

For example, in the above-mentioned embodiments, the second colored portion 50 is formed in the respective regions shown in FIGS. 54 to 58. However, the second colored portion 50 is not always limited to such a position, and the second colored portion 50 may be formed at any position offset with respect to the first colored portion 49.

In the above-mentioned embodiment, a mark is formed of only the projecting portion 3 formed on the side portion 1c. However, a mark may have the following configuration.

Figure 60:
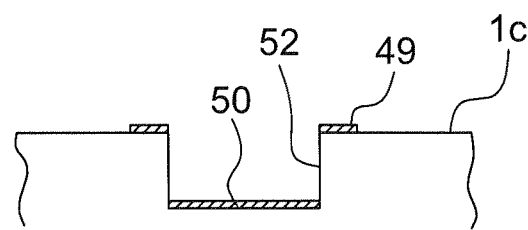
FIG. 60 is a sectional view showing other example of the projecting portion.

In FIG. 60, a mark is formed by forming a recessed portion 52 on a surface of a side portion 1c. In this case, a first colored portion 49 is formed on a bottom surface of the recessed portion 52, and a second colored portion 50 is formed in a region outside an opening edge of the recessed portion 52.

Figure 61:
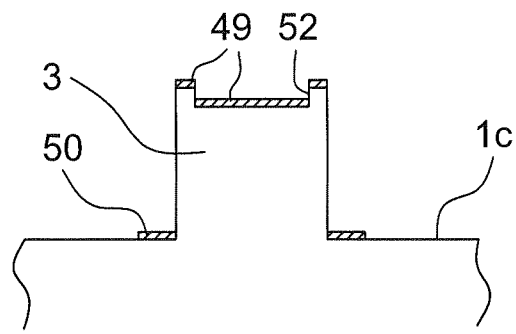
FIG. 61 is a sectional view showing other example of the projecting portion.

FIG. 61 shows the case where a recessed portion 52 is formed on an outer surface of a projecting portion 3 so that a mark has the so-called brimmed structure. In this configuration, a depth size of the recessed portion 52 is set to a value approximately half of a projecting size of the projecting portion 3 from an outer surface of a side portion 1c. In this case, a first colored portion 49 may be also formed on a bottom surface of the recessed portion 52.

Figure 62:
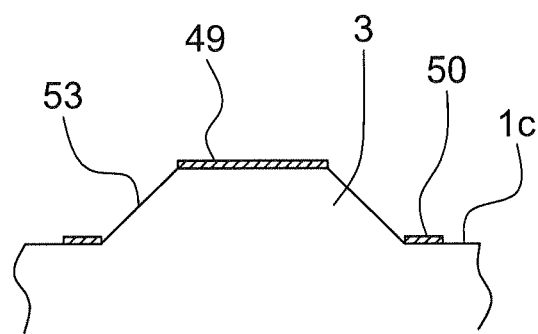
FIG. 62 is a sectional view showing other example of the projecting portion.

In FIG. 62, side surfaces 47 of a projecting portion 3 are formed of inclined surfaces 53 which are gradually lowered toward the outside. A color is not applied to the inclined surfaces 53, a first colored portion 49 is formed on an upper flat surface, and a second colored portion 50 is formed in a region of a portion of any one of peripheries of the projecting portion 3 shown in FIGS. 54 to 58 in a representing manner.

In the above-mentioned embodiment, the first colored portion 49 and the second colored portion 50 are formed using substantially same colors. However, at least one of hue, brightness, and chroma which are three elements of color may be changed between the first colored portion 49 and the second colored portion 50.

In the above-mentioned embodiment, the colored region is formed of a color having the substantially same gray scale. However, the colored region may have gradation where shade, brightness, hue or the like is changed little by little in a stepwise manner in various directions such as the tire circumferential direction, the tire radial direction, the direction from the center to the periphery and the like.

Further, in the above-mentioned embodiment, the first colored portion 49 is formed on the upper surface of the projecting portion 3 or the bottom surface of the recessed portion 52. However, the first colored portion 49 is not always necessary.

What is claimed is:

1. A pneumatic tire comprising:
   a recessed portion or a projecting portion formed on a surface of a sidewall and forming a mark;
   said mark having a shape of a character, figure, or symbol;
   a first color portion formed on a flat bottom surface of said recessed portion or a flat top surface of said projecting portion, said first color portion including a first color applied to said flat bottom surface or said flat top surface, said first color having a different color from a color of the pneumatic tire;
   a second colored portion formed on said surface of said sidewall so as to be along at least a portion of an outer edge of the mark, said second colored portion including a second color applied to said surface of said sidewall, said second color having a different color from said color of said pneumatic tire; and
   said recessed portion or said projecting portion having a perimeter wall that extends between a) said flat bottom surface of said recessed portion or said flat top surface of said projecting portion and b) said surface of said sidewall, said perimeter wall having the color of the pneumatic tire free of any color applied to the perimeter wall, wherein
   the second colored portion is offset from the outer edge of the mark, and
   an offset amount which is a distance between a profile line of the second colored portion and the outer edge of the mark differs with respect to at least one of a tire radial direction and the tire circumferential direction depending on a position on the profile line.

2. The pneumatic tire according to claim 1, wherein the offset amount which is a distance between the profile line of the second colored portion and the outer edge of the mark is set in a tire circumferential direction to a value which falls within a range of 0.5% to 40% of a maximum size of the mark in the tire circumferential direction.

3. The pneumatic tire according to claim 1, wherein said pneumatic tire includes said projecting portion and a recessed region is formed on the top surface of the projecting portion,
   the first colored portion is formed on the top surface of the projecting portion where the recessed region is not formed and a bottom surface of the recessed region.

4. The pneumatic tire according to claim 1, wherein the second color of the second colored portion is different from the first color of the first colored portion.

5. The pneumatic tire according to claim 1, wherein the second colored portion changes in at least one of hue, brightness, and chroma from a certain position to another position.

* * * * *